United States Patent
Okada

(10) Patent No.: US 9,952,335 B2
(45) Date of Patent: Apr. 24, 2018

(54) RADIATION DETECTOR, RADIOGRAPHIC IMAGING DEVICE AND RADIOGRAPHIC IMAGING SYSTEM

(71) Applicant: FUJIFILM CORPORATION, Minato-ku, Tokyo (JP)

(72) Inventor: Yoshihiro Okada, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 20 days.

(21) Appl. No.: 15/152,010

(22) Filed: May 11, 2016

(65) Prior Publication Data

US 2016/0252630 A1    Sep. 1, 2016

Related U.S. Application Data

(63) Continuation of application No. 13/528,857, filed on Jun. 21, 2012, now Pat. No. 9,366,766.

(30) Foreign Application Priority Data

Jul. 7, 2011    (JP) .................................. 2011-151219

(51) Int. Cl.
*G01T 1/20* (2006.01)
*H04N 5/32* (2006.01)

(52) U.S. Cl.
CPC ............. *G01T 1/2018* (2013.01); *H04N 5/32* (2013.01)

(58) Field of Classification Search
CPC .......... G01T 1/105; G01T 1/15; G01T 1/2942
See application file for complete search history.

(56) References Cited

U.S. PATENT DOCUMENTS 3,268,728 A    8/1966  Stoddart et al.
4,605,859 A    8/1986  Dilanni et al.
(Continued)

FOREIGN PATENT DOCUMENTS

JP    2003-219278 A    7/2003
JP    2004-085383 A    3/2004
(Continued)

OTHER PUBLICATIONS

Japanese Office action dated Aug. 26, 2014, issued for Japanese Patent Application No. 2011-151219 corresponding to the instant application.
(Continued)

*Primary Examiner* — David Porta
*Assistant Examiner* — Djura Malevic
(74) *Attorney, Agent, or Firm* — SOLARIS Intellectual Property Group, PLLC

(57) ABSTRACT

The present invention provides a radiation detector, a radiographic imaging device and a radiographic imaging system that may detect radiation with high precision. Namely, in the radiation detector, radiation detection pixels include detection TFTs, and light that has been converted from radiation is illuminated directly from a scintillator onto the detection TFTs. Accordingly, leak current occurs in semiconductor active layers of the detection TFTs corresponding to the amount (intensity) of the illuminated light, and the leak current flows in to signal lines. Accordingly, radiation may be detected by monitoring the leak current, and enables timings, such as the start of irradiation of radiation, to be detected.

12 Claims, 17 Drawing Sheets

(56) References Cited

U.S. PATENT DOCUMENTS

| | | | |
|---|---|---|---|
| 4,631,411 A | 12/1986 | Noback | |
| 5,530,238 A | 6/1996 | Meulenbrugge et al. | |
| 5,818,898 A | 10/1998 | Tsukamoto et al. | |
| 5,962,857 A | 10/1999 | McKeever et al. | |
| 6,035,013 A | 3/2000 | Orava et al. | |
| 6,208,710 B1 | 3/2001 | Nagai | |
| 6,239,439 B1 | 5/2001 | Itabashi et al. | |
| 6,307,915 B1 | 10/2001 | Frojdh | |
| 6,403,964 B1 | 6/2002 | Kyyhkynen | |
| 6,429,436 B1 | 8/2002 | Tomisaki et al. | |
| 6,596,998 B1 | 7/2003 | Siedel | |
| 6,671,394 B1 | 12/2003 | Sako | |
| 6,801,598 B2 | 10/2004 | Tashiro et al. | |
| 6,849,853 B2 | 2/2005 | Ikeda et al. | |
| 6,967,332 B2 | 11/2005 | Kobayashi et al. | |
| 7,006,598 B2* | 2/2006 | Morii | H01L 27/14658 250/370.07 |
| 7,078,701 B2 | 7/2006 | Ishii et al. | |
| 7,079,189 B2 | 7/2006 | Tsuji et al. | |
| 7,148,487 B2 | 12/2006 | Ishii et al. | |
| 7,231,018 B2* | 6/2007 | Morii | H01L 27/14658 250/370.07 |
| 7,235,789 B2 | 6/2007 | Kobayashi et al. | |
| 7,368,724 B2 | 5/2008 | Morii et al. | |
| 7,408,169 B2 | 8/2008 | Ishii et al. | |
| 7,495,224 B2 | 2/2009 | Widener et al. | |
| 7,507,970 B2 | 3/2009 | Kobayashi et al. | |
| 7,554,071 B2 | 6/2009 | Moholt | |
| 7,723,696 B2 | 5/2010 | Shirakawa et al. | |
| 7,755,056 B2 | 7/2010 | Bell | |
| 7,923,695 B2 | 4/2011 | Ishii et al. | |
| 8,067,743 B2* | 11/2011 | Ishii | G01T 1/2018 250/370.08 |
| 8,368,027 B2 | 2/2013 | Ishii et al. | |
| 8,477,225 B2 | 7/2013 | Moholt | |
| 8,537,149 B2 | 9/2013 | Fann et al. | |
| 8,705,700 B2 | 4/2014 | Eguchi | |
| 2002/0025022 A1 | 2/2002 | Kaifu et al. | |
| 2002/0044211 A1 | 4/2002 | Tsuji et al. | |
| 2002/0101960 A1 | 8/2002 | Nokita | |
| 2003/0030004 A1 | 2/2003 | Dixon et al. | |
| 2003/0086523 A1 | 5/2003 | Yashiro et al. | |
| 2004/0004430 A1 | 1/2004 | Hamada et al. | |
| 2004/0041097 A1 | 3/2004 | Ishii et al. | |
| 2004/0046879 A1 | 3/2004 | Ohzu et al. | |
| 2004/0090405 A1 | 5/2004 | Izumi | |
| 2004/0101100 A1* | 5/2004 | Morii | H01L 27/14658 378/98.7 |
| 2004/0149920 A1 | 8/2004 | Ishii et al. | |
| 2004/0256567 A1 | 12/2004 | Nokita | |
| 2006/0022118 A1 | 2/2006 | Morii et al. | |
| 2006/0056581 A1 | 3/2006 | Hoffmann et al. | |
| 2006/0258080 A1 | 11/2006 | Takahashi | |
| 2007/0187610 A1* | 8/2007 | Morii | H01L 27/14658 250/370.09 |
| 2007/0221857 A1 | 9/2007 | Kobayashi et al. | |
| 2008/0029688 A1 | 2/2008 | Yagi et al. | |
| 2008/0240339 A1 | 10/2008 | Du et al. | |
| 2008/0272305 A1 | 11/2008 | Shirakawa et al. | |
| 2009/0026379 A1 | 1/2009 | Yaegashi et al. | |
| 2009/0127469 A1 | 5/2009 | Widener et al. | |
| 2009/0190020 A1 | 7/2009 | Gomi et al. | |
| 2009/0224162 A1 | 9/2009 | Inuiya et al. | |
| 2010/0078583 A1 | 4/2010 | Tsubota et al. | |
| 2010/0181491 A1 | 7/2010 | Karim et al. | |
| 2010/0246770 A1 | 9/2010 | Niwa | |
| 2013/0037699 A1 | 2/2013 | Ihori et al. | |

FOREIGN PATENT DOCUMENTS

| | | |
|---|---|---|
| JP | 2004-165386 A | 6/2004 |
| JP | 2004-170216 A | 6/2004 |
| JP | 2004-228517 A | 8/2004 |
| JP | 2006-319032 A | 11/2006 |
| JP | 2007-103578 A | 4/2007 |
| JP | 2008-148090 A | 6/2008 |
| JP | 2010-056396 A | 3/2010 |

OTHER PUBLICATIONS

Japanese Office action dated Mar. 31, 2015, issued for Japanese Patent Application No. 2011-151219 corresponding to the instant application.

English language translation of the following: Office action dated Aug. 9, 2016 from the JPO in a Japanese patent application corresponding to the instant patent application. This office action translation is submitted now in order to supplement the understanding of the cited references which are being disclosed in the instant Information Disclosure Statement.

* cited by examiner

RADIATION DETECTOR, RADIOGRAPHIC IMAGING DEVICE AND RADIOGRAPHIC IMAGING SYSTEM

CROSS-REFERENCE TO RELATED APPLICATION

This application is a continuation of, and claims priority to, U.S. application Ser. No. 13/528,857, filed on Jun. 21, 2012, which claims priority under 35 USC 119 from Japanese Patent Application No. 2011-151219, filed on Jul. 7, 2011. The present continuation application hereby incorporates by reference all documents referenced above.

BACKGROUND OF THE INVENTION

Field of the Invention

The present invention relates to a radiation detector, a radiographic imaging device and a radiographic imaging system. In particular, the present invention relates to a radiation detector that accumulates charges generated due to irradiation of radiation, and detects electric signals corresponding to the accumulated charges as data expressing an image. The present invention also relates to a radiographic imaging device that employs the radiation detector for radiographic imaging, and a radiographic imaging system.

Description of the Related Art

Radiographic imaging devices for imaging radiographic images are known in which a radiation detector detects radiation that has been irradiated from a radiation irradiation device and passed through an imaging subject. A radiation detector of such a radiographic imaging device is configured with plural pixels disposed in a matrix, each pixel including a sensor portion of, for example, a photoelectric conversion element, that generates charges when irradiated with radiation or when illuminated with light that has been converted from radiation, and a switching element that reads the charges generated in the sensor portion. Such a radiographic imaging device performs radiographic imaging by accumulating charges generated due to irradiated radiation, and detecting (reading) electric signals corresponding to the accumulated charges as data expressing a radiographic image.

As such a radiographic imaging device, there are radiographic imaging devices known that synchronize with a timing of the radiation irradiation from a radiation irradiation device, and for example, a start timing and an end timing for charge accumulation by the radiation detector. As an example of such technology, there is an automated exposure control (referred to below as AEC). In AEC, radiation is detected based on the charges (electric signals) generated in sensor portions due to radiation irradiation, in order to start or stop the accumulation of charges by the radiation detector.

When TFT switches, employed as switching elements for reading charges generated in the sensor portions, are irradiated with X-rays, a leak current occurs. For example, Japanese Patent Application Laid-Open (JP-A) No. 2008-148090 discloses a technology for correcting the leak current that becomes added to image signals, due to the leak current increasing with increasing X-ray irradiation amount.

However, in the technology described in JP-A No. 2008-148090, there are cases in which AEC cannot be performed appropriately by detecting the leak current of the TFT switches for reading image signals to perform radiation detection.

SUMMARY OF THE INVENTION

The present invention provides a radiation detector, a radiographic imaging device and a radiographic imaging system that may accurately detect radiation.

A first aspect of the present invention is a radiation detector including a sensor portion, provided to each of a plurality of pixels disposed in a matrix, that generates charges due to irradiation of radiation; a switching element, provided to each of the plurality of pixels, that output charges generated in the sensor portion to a signal line; and a radiation detection section including, a conversion section that converts the irradiated radiation into light, and that illuminates the light, and a semiconductor element that outputs electric signals according to the illuminated light to the signal line or to a radiation detection signal line.

The radiation detector of the first aspect of the present invention includes plural pixels disposed in a matrix. Each of the pixels includes the sensor portion that generates charges due to irradiated radiation, and the switching element for outputting charges generated in the sensor portion of each of the pixels to the signal line. The radiation detector of the first aspect of the present invention further includes the radiation detection section including the conversion section that converts the irradiated radiation into light and illuminating the light, and the semiconductor element for outputting the leak current, from the conversion section, that varies according to the light illuminated, to the signal line or to the radiation detection signal line.

According to the illuminated light intensity, the semiconductor element has a larger leak current the higher the light intensity, and has a smaller leak current the lower the light intensity. Accordingly, the radiation may be detected by using the leak current that occurs in the semiconductor element according to light converted from irradiated radiation in the conversion section. Accordingly, the first aspect of the present invention may detect radiation more precisely than the conventional radiation detector.

In a second aspect of the present invention, in the first aspect, the semiconductor element may be directly illuminated with light from the conversion section.

The semiconductor element is illuminated directly with light from the conversion section to generate the leak current corresponding to the light. Accordingly, the second aspect of the present invention may improve the precision of the radiation detection.

In a third aspect of the present invention, in the above aspects, the sensor portion may include, a photoelectric conversion section provided for each of the pixels, and a conversion section, provided so as to overlap with the photoelectric conversion sections of the plurality of the pixels, that converts radiation into light and illuminates the light, wherein the semiconductor element may be provided below the conversion section of the sensor portion and not overlapping with the photoelectric conversion section.

Accordingly, the third aspect of the present invention is configured such that light is illuminated onto each of the sensor portions and semiconductor elements from the same conversion section. Accordingly, the third aspect of the present invention may suppress sensitivity differences from arising between each of the sensor portions and semiconductor elements. Due to such a configuration, the third aspect of the present invention may further improve sensitivity, since light is illuminated directly onto the semiconductor element from the conversion section without passing through the photoelectric conversion section.

In a fourth aspect of the present invention, the above aspects, the sensor portion may include, a conversion section that converts radiation into light and illuminates the light, and a photoelectric conversion section provided below the conversion section such that the photoelectric conversion section overlaps with a section of the conversion section, wherein the switching element may be provided below the photoelectric conversion section, and wherein the semiconductor element may be provided below a region of the conversion section not overlapping with the photoelectric conversion section.

In a fifth aspect of the present invention, the above aspects, the semiconductor element may be a switching element applied with a bias voltage.

In a sixth aspect of the present invention, the above aspects, the semiconductor element may be a switching element including a gate electrode to which a voltage is applied for controlling an amount of current of the electric signals output.

In cases in which the semiconductor element does not include a gate electrode, or in cases in which a high voltage is applied to the gate electrode, the leak current amount increases, and there are cases in which a negative impact from noise arises. Therefore, in the sixth aspect of the present invention, an OFF voltage is, for example, applied to the gate electrode. Accordingly, the sixth aspect of the present invention may control the leak current amount, and may reduce the impact of noise.

In a seventh aspect of the present invention, in the above aspects, one of the radiation detection sections may be provided to each of a predetermined plurality of radiation detection pixels that are employed for radiation detection from among the plurality of pixels.

In an eighth aspect of the present invention, in the above aspects, one of the radiation detection sections may be provided for each of the plurality of pixels.

In a ninth aspect of the present invention, in the eighth aspect, out of the plurality of pixels, the radiation detection section provided to each pixel, other than the radiation detection pixels, may not be connected to the signal line, a radiation detection signal line, and any combination thereof.

In a tenth aspect of the present invention, in the first aspect to the sixth aspect, the radiation detection section may be provided between the sensor portion and the sensor portion of adjacent pixels.

In an eleventh aspect of the present invention, in the above aspects, the correspondence relationship between irradiated radiation amount and charge amount generated by the sensor portion, may match the correspondence relationship between the irradiated radiation amount and charge amount of the electric signals output from the semiconductor element.

Accordingly, the eleventh aspect of the present invention is configured such that the correspondence relationship between the irradiated radiation amount and the charge amount in the sensor portion and in the semiconductor element of the radiation detection section match to each other. Therefore, in the eleventh aspect of the present invention, since radiation detection may be performed by the semiconductor element of the radiation detection section at the same (or close enough to be considered the same) sensitivity as during radiographic imaging, precise detection of the radiation may be possible.

In a twelfth aspect of the present invention, in the above aspects, the sensor portion may include a light blocking section that blocks light from being illuminated onto the photoelectric conversion element other than the light illuminated from the conversion section.

A thirteenth aspect of the present invention is a radiographic imaging device including: the radiation detector according to the above aspects; a detection section that detects radiation amount based on charges output from the radiation detection section of the radiation detector; and an imaging section that acquire a radiographic image based on amount of charges output from the sensor portions.

In a fourteenth aspect of the present invention, in the thirteenth aspect, may further include: a read circuit, provided to each of the signal lines of the radiation detector that read out the charges output to the signal lines, wherein the radiation detection section of the radiation detector may output the electric signals to the signal line.

Due to such a configuration, in the fourteenth aspect of the present invention, charges employed for acquiring radiographic images output to the signal line by the switching element and charges for radiation detection output to the signal line by the radiation detection section may be read using the same reading circuit. Consequently, in the fourteenth aspect of the present invention, there is no need to provide separate reading circuits for radiation detection. Since the same signal lines may also be employed in the fourteenth aspect of the present invention, there is no need to provide separate dedicated signal lines for radiation detection. Consequently, the fourteenth aspect of the present invention may achieve an enhanced S/N ratio by increasing the fill factor.

A fifteenth aspect of the present invention is a radiographic imaging system including: a radiation irradiation section; and the radiographic imaging device according to the thirteenth aspect or the fourteenth aspect for imaging a radiographic image based on radiation irradiated from the radiation irradiation section.

According to the above aspects of the present invention, testing may be performed easily and the radiation may be detected precisely.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

Hereinafter, explanation follows regarding an example of an exemplary embodiment, with reference to the drawings.

Figure 1:
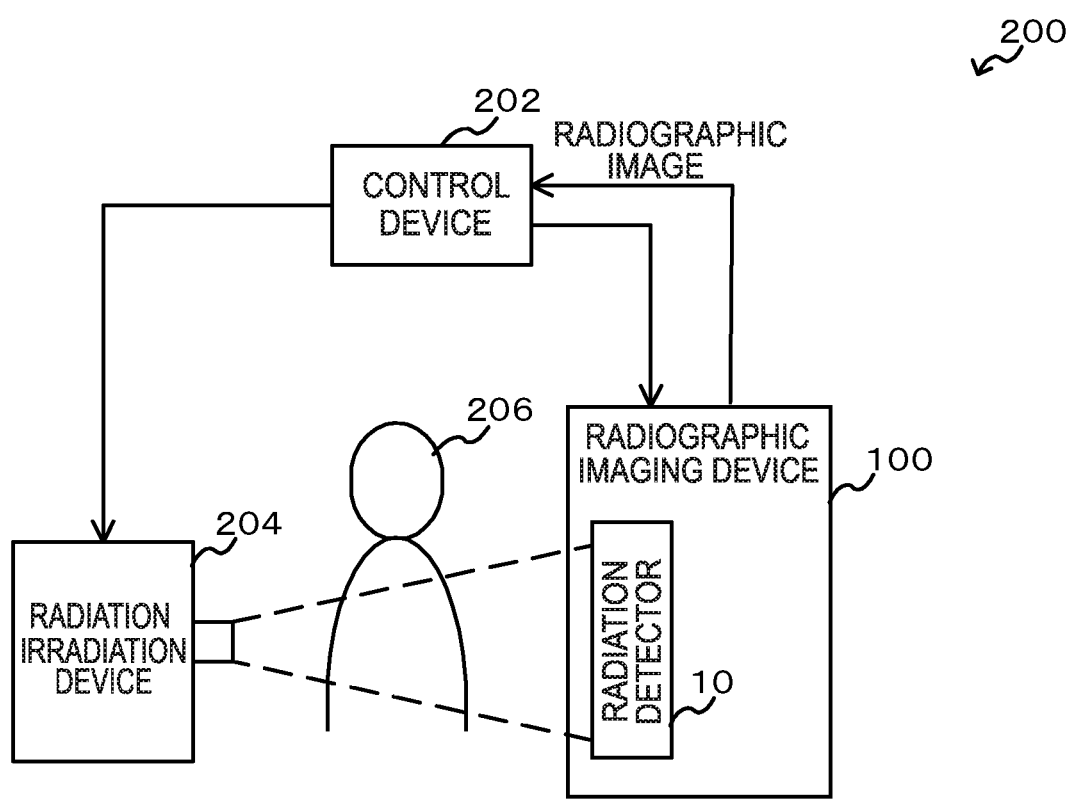
FIG. 1 is a schematic configuration diagram illustrating a radiographic imaging system according to a first exemplary embodiment.

Explanation first follows regarding a schematic configuration of a radiographic imaging system, in which a radiation detector of the present exemplary embodiment is employed. FIG. 1 is a schematic configuration diagram of an example of a radiographic imaging system of the present exemplary embodiment.

A radiographic imaging system 200 includes: a radiation irradiation device 204, a radiographic imaging device 100 equipped with a radiation detector 10, and a control device 202. The radiation irradiation device 204 irradiates radiation (for example, X-rays) onto an imaging subject 206. The radiation detector 10 detects radiation that has been irradiated from the radiation irradiation device 204 and passed through the imaging subject 206. The control device 202 instructs imaging of a radiographic image, and acquires radiographic images from the radiographic imaging device 100. Radiation irradiated from the radiation irradiation device 204, according to timing controlled by the control device 202, is irradiated onto the radiographic imaging device 100. The radiation irradiated onto the radiographic imaging device 100 carries image data due to passing through the imaging subject 206 positioned in an imaging position.

Figure 2:
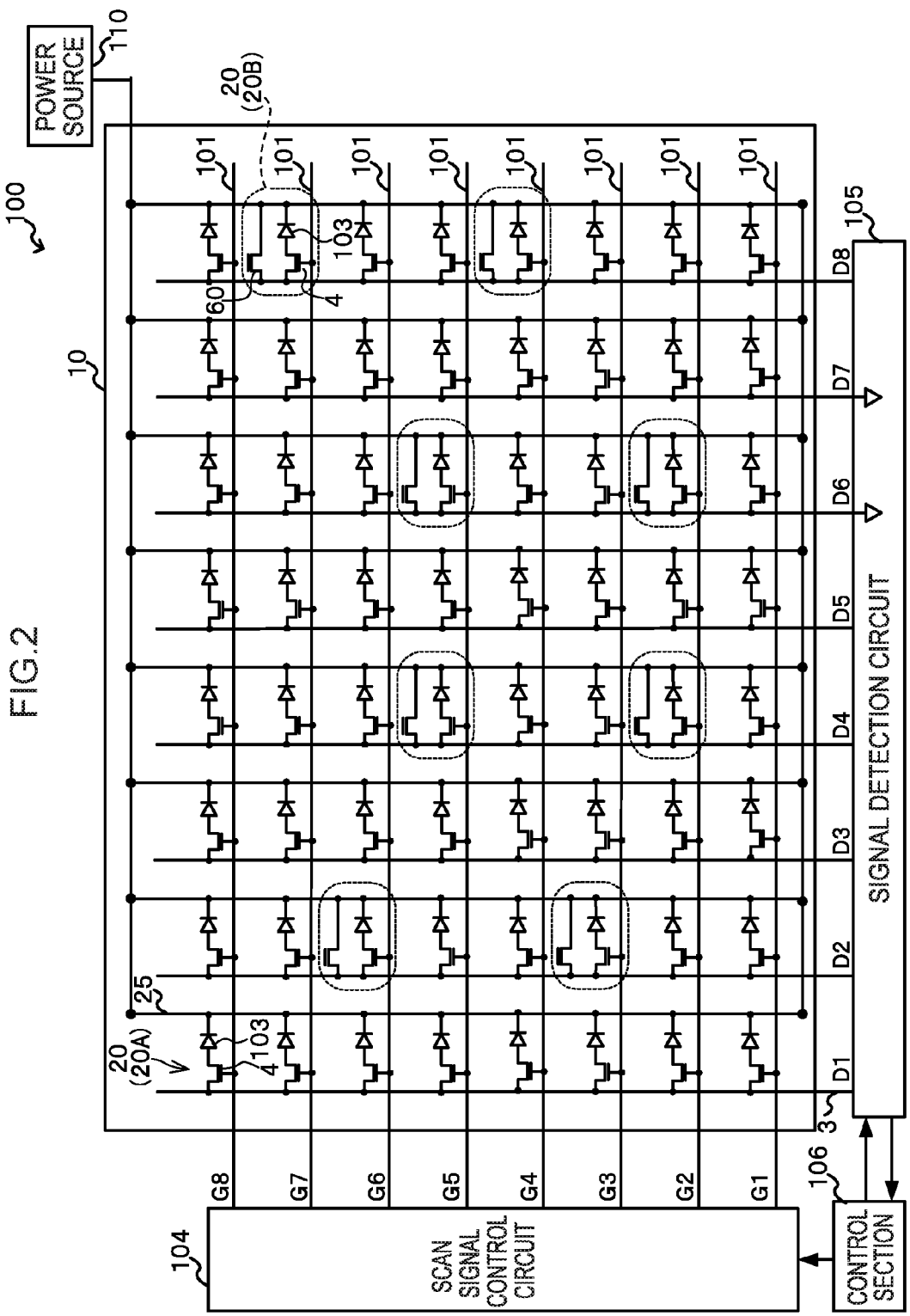
FIG. 2 is a diagram illustrating an overall configuration of a radiographic imaging device according to the first exemplary embodiment.

Explanation now follows regarding a schematic configuration of the radiographic imaging device 100 according to the present exemplary embodiment. FIG. 2 is a configuration diagram illustrating an example of an overall configuration of a radiographic imaging device 100 according to the present exemplary embodiment. Hereinafter, a case in which the present invention is applied to an indirect-conversion-type radiation detector 10, in which the radiation such as X-rays is first converted into light, and then the converted light is converted into charges, will be described as the present exemplary embodiment. In the present exemplary embodiment, the radiographic imaging device 100 is configured including the indirect-conversion-type radiation detector 10.

The radiation detector 10 includes plural pixels 20 arrayed in a matrix. Each of the pixels 20 includes a sensor portion 103 and a TFT switch 4. The sensor portions 103 receive light, generate charges, and accumulate the generated charges. The TFT switches 4 are switching elements for reading out the charges accumulated in the sensor portions 103. In the present exemplary embodiment, the sensor portions 103 generate charges when illuminated with light, that has been converted from radiation by a scintillator (see FIG. 4, FIG. 6) that serves as a wavelength conversion element.

The pixels 20 are plurally arranged in the matrix in a scan line direction (the direction of scan lines 101 in FIG. 2, which is the horizontal direction in FIG. 2), and a signal line direction intersecting the scan line direction (the direction of signal lines 3 in FIG. 2, which is the vertical direction in FIG. 2). Note that the arrangement of the pixels 20 is simplified in FIG. 2, and for example, the pixels 20 may be arranged in 1024, in scan line direction, by 1024, in signal line direction.

In the present exemplary embodiment, among the plural pixels 20, pixels for radiographic imaging 20A (imaging pixels) and pixels for radiation detection 20B (radiation detection pixels) are specified in advance. In FIG. 2, the radiation detection pixels 20B are encircled by broken lines. The imaging pixels 20A are used for generating an image representing the radiation based on the detected radiation. The radiation detection pixels 20B are pixels that are used for detecting radiation, and that output charges even in a charge accumulation period. Each of the imaging pixels 20A is configured with a sensor portion 103 and a TFT switch 4. A first end of the sensor portion 103 of each of the imaging pixels 20A is connected to a signal line 3 through the TFT switch 4.

The radiation detection pixels 20B are pixels employed for detecting radiation, and in the present exemplary embodiment, the radiation detection pixels 20B are employed for detecting the start of irradiation of radiation. The radiation detection pixels 20B of the present exemplary embodiment each includes a sensor portion 103, a TFT switch 4 functioning as a TFT that controls the output of charges from the sensor portion 103 to the signal line 3, and a detection TFT 60 functioning as a phototransistor for detecting radiation. One end of each of the sensor portions 103 of the radiation detection pixels 20B, similarly to the sensor portions 103 of the imaging pixels 20A, is connected through the TFT switch 4 to the signal line 3. One end of the detection TFT 60 is connected to the signal line 3, and the other end is connected to the common electrode line 25. There is no gate terminal disposed in the detection TFT 60. Since the detection TFTs 60 are directly connected to the signal lines 3, the radiation detection pixels 20B output leak current of the detection TFTs 60 (charges arising due to leak current) even during a charge accumulation period.

Plural scan lines 101 and plural signal lines 3 are disposed in the radiation detector 10 on a substrate 1 (see FIG. 4, FIG. 6) so as to intersect with each other. The scan lines 101 switch the TFT switches 4 ON or OFF. The signal lines 3 read out the charges accumulated in the sensor portions 103.

In the present exemplary embodiment, one single signal line 3 is provided for each pixel line in the signal line direction, and a single of the scan lines 101 is provided for each pixel line in the intersecting direction. For example, equivalent to the number of columns and the number of rows, 1024 signal lines 3 and 1024 scan lines 101 are provided, in a case where there are 1024×1024 individual pixels 20 disposed in the scan line direction and the signal line direction.

Further, in the radiation detector 10, common electrode lines 25 are provided parallel to each of the signal lines 3. The common electrode lines 25 are configured as parallel lines connected together in parallel, and first ends of the common electrode lines 25 are connected to a power source 110 for supplying a specific bias voltage thereto. The sensor portions 103 are connected to the common electrode lines 25 and are applied with a bias voltage from the power source 110 through the common electrode lines 25. The detection TFTs 60 are also connected to the common electrode lines 25 and are applied with a bias voltage from the power source 110 through the common electrode lines 25.

Scan signals for switching each of the TFT switches 4 flow in the scan lines 101. Accordingly, each of the TFT switches 4 are switched by the scan signals flowing in each of the scan lines 101.

Electric signals corresponding to the charges that have been accumulated in each of the pixels 20 flow in each of the signal lines 3, depending on the switching state of the TFT switches 4 of each of the pixels 20. Namely, in the given signal line 3, electric signals corresponding to the charges that were accumulated in the pixels 20 flow due to switching ON the TFT switch 4 of any pixels 20 connected to a given signal line 3.

A signal detection circuit 105 for detecting the electric signals flowing out of each of the signal lines 3 is connected to each of the signal lines 3. Note that "detection" of the electric signals refers to sampling the electric signals.

A scan signal control circuit 104 for outputting scan signals to each of the scan lines 101 for switching the TFT switches 4 ON/OFF, is connected to each of the scan lines 101. FIG. 2 is simplified to show a single signal detection circuit 105 and a single scan signal control circuit 104. However, for example, the signal detection circuit 105 and the scan signal control circuit 104 may be plurally provided, and predetermined numbers (for example, 256) of the signal lines 3 and the scan lines 101 may be connected to the respective signal detection circuits 105 and scan signal control circuits 104. For example, if 1024 each of the signal lines 3 and the scan lines 101 are provided, four of the scan signal control circuits 104 may be provided and sets of 256 of the scan lines 101 may be connected thereto, and four of the signal detection circuits 105 may be provided and sets of 256 of the signal lines 3 may be connected thereto.

Each signal detection circuit 105 incorporates an amplification circuit 50 for each signal line 3 (see FIG. 6), which amplifies the inputted electric signals. In the signal detection circuit 105, the electric signals inputted by the signal lines 3 are amplified by the amplification circuits and are converted to digital signals by an analog-to-digital converter (ADC).

A control section 106 is connected to the signal detection circuit 105 and the scan signal control circuit 104. The control section 106 applies predetermined process, such as noise reduction, gain correction, and the like, to the digital signals converted by the signal detection circuit 105 and generates radiographic images expressing irradiated radiation. Further, the control section 106 outputs control signals representing signal detection timings to the signal detection circuit 105, and outputs control signals representing scan signal output timings to the scan signal control circuit 104.

The control section 106 of the present exemplary embodiment is configured by a microcomputer, and is provided with a central processing unit (CPU), a ROM, a RAM and a non-volatile memory section configured by flash memory or the like. The control section 106 executes a program stored in the ROM with the CPU, and thus performs control for imaging a radiographic image.

Figure 3:
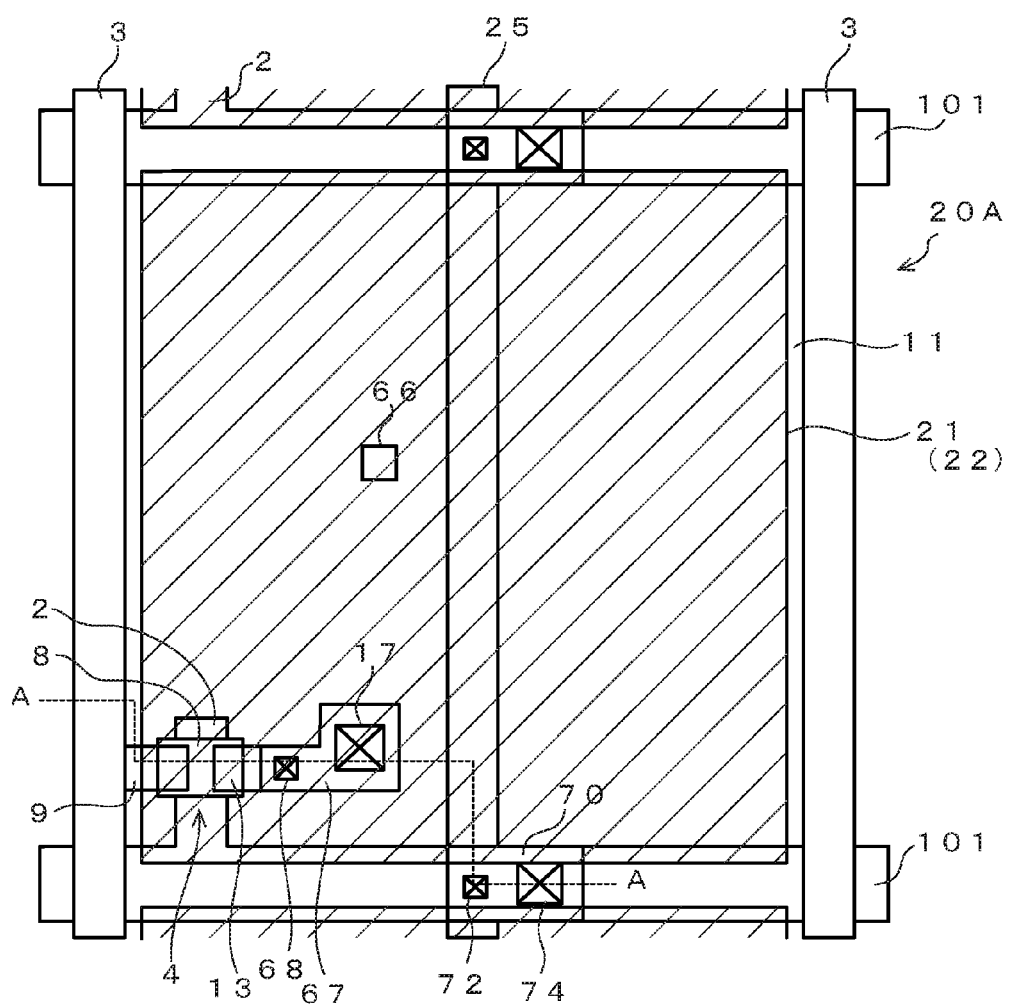
FIG. 3 is a plan view illustrating a configuration of an imaging pixel according to the first exemplary embodiment.
Figure 4:
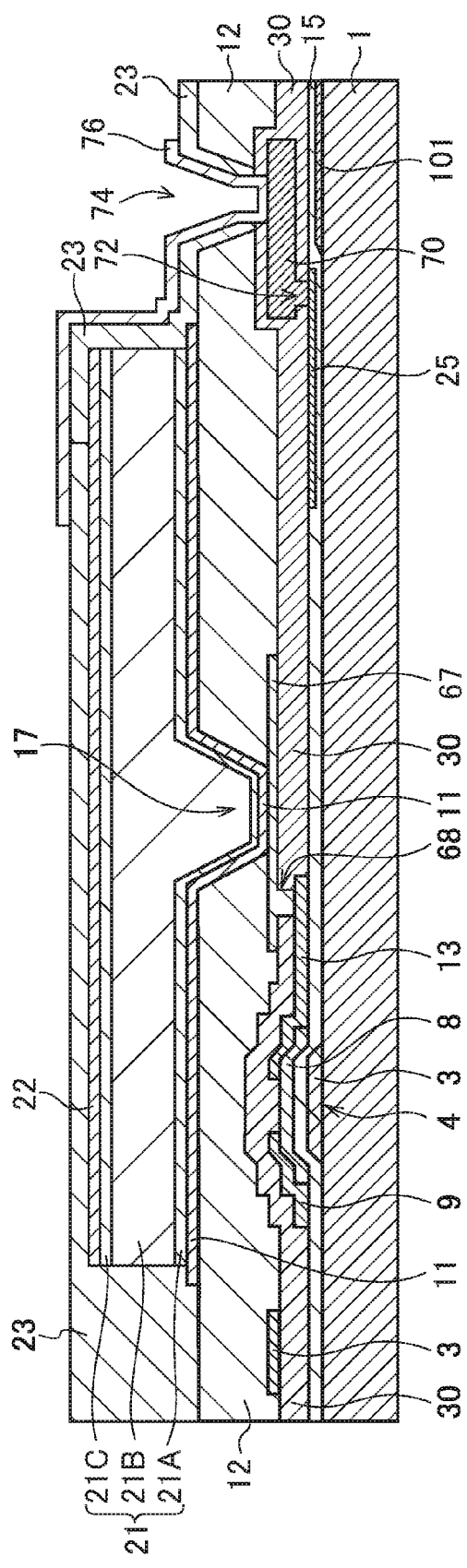
FIG. 4 is a cross-sectional view taken along line A-A of an imaging pixel in FIG. 3.
Figure 5:
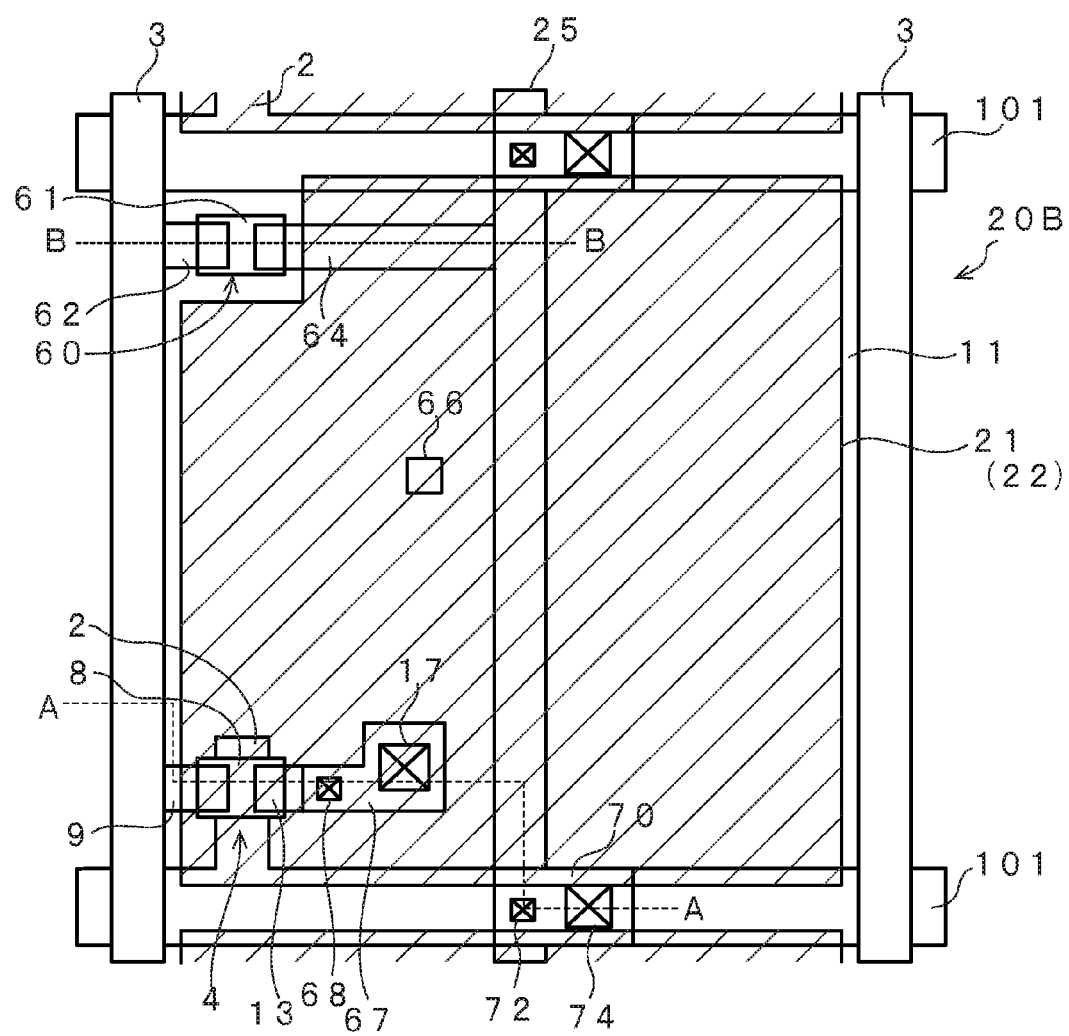
FIG. 5 is a plan view illustrating a configuration of a radiation detection pixel according to the first exemplary embodiment.
Figure 6:
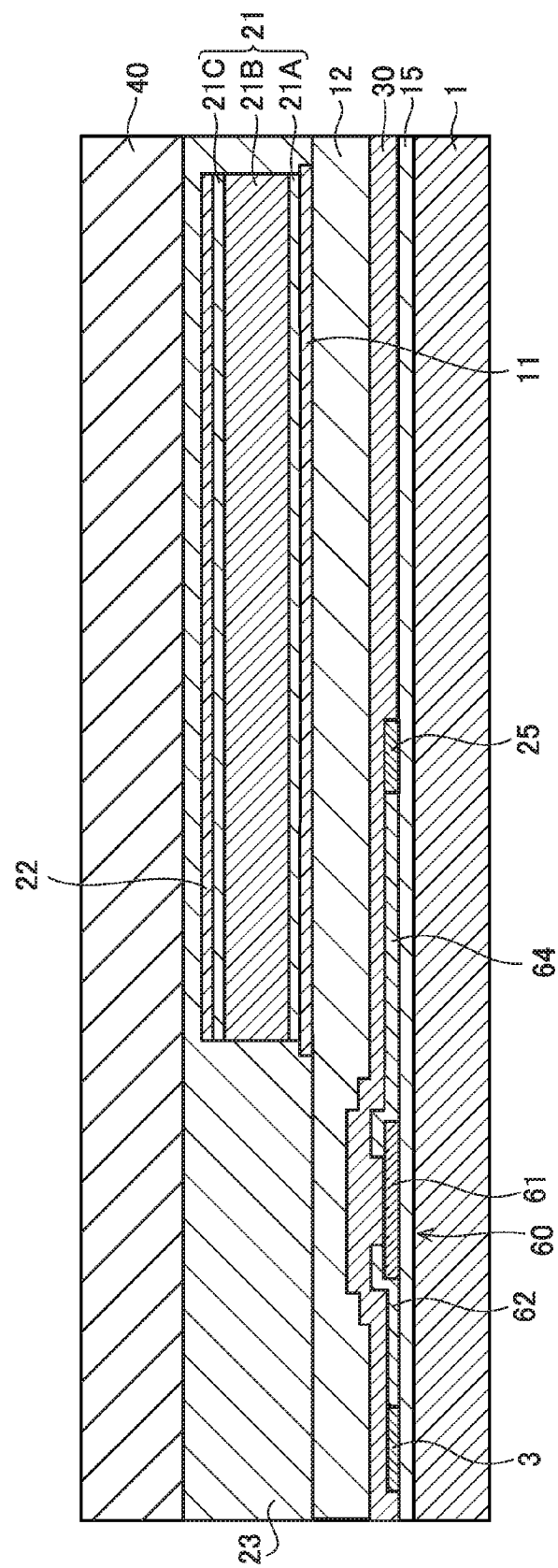
FIG. 6 is a cross-sectional view taken along line B-B of the radiation detection pixel illustrated in FIG. 5.

Detailed explanation now follows regarding the imaging pixels 20A and the radiation detection pixels 20B, with reference to FIG. 3 to FIG. 6. FIG. 3 is a plan view illustrating a structure of an imaging pixel 20A according to the present exemplary embodiment. FIG. 4 is a cross-sectional view of the imaging pixel 20A of FIG. 3, taken on line A-A. FIG. 5 is a plan view illustrating a structure of a radiation detection pixel 20B according to the present exemplary embodiment. FIG. 6 is a cross-sectional view of a radiation detection pixel 20B of FIG. 5, taken on line B-B.

The pixels 20 of the present exemplary embodiment include the sensor portions 103 within each single pixel. The sensor portions 103 in the present exemplary embodiment are each configured including a lower electrode 11, a semiconductor layer 21 and an upper electrode 22.

As illustrated in FIG. 3, the imaging pixels 20A of the present exemplary embodiment are each equipped with one of the sensor portions 103 and one of the TFT switches 4. Charges that have been generated in the semiconductor layer 21 of each of the sensor portions 103 are read by the signal line 3 according to the ON/OFF state of the TFT switch 4.

As illustrated in FIG. 4, each of the imaging pixels 20A of the radiation detector 10 is configured with the scan line 101 (see FIG. 3) and the gate electrode 2 formed on the insulating substrate 1 of a material such as alkali-free glass. The scan line 101 and the gate electrode 2 are connected together (see FIG. 3). The wiring layer in which the scan line 101 and the gate electrode 2 are formed (this wiring layer is referred to below as "first wiring layer") is formed using Al or Cu or a layered film made mainly of Al or Cu. However, the material of the first wiring layer is not limited to these.

An insulating layer 15 is formed over the whole of the first signal layer. Portions of the insulating layer 15 that are disposed above the gate electrodes 2 operates as gate insulation films of the TFT switches 4. The insulating layer 15 is formed of, for example, SiNx or the like, and is formed by, for example, chemical vapor deposition (CVD) film formation.

Semiconductor active layers 8 are formed on the insulating layer 15 as islands over the gate electrodes 2. The semiconductor active layers 8 are channels portions of the TFT switches 4 and include amorphous silicon films, for example.

Source electrodes 9 and drain electrodes 13 are formed in a layer thereabove. The signal lines 3 are also formed in the wiring layer in which the source electrodes 9 and the drain electrodes 13 are formed. The source electrodes 9 are connected to the signal lines 3 (see FIG. 3). The wiring layer in which the source electrodes 9, drain electrodes 13 and signal lines 3 are formed (hereinafter referred to as "the second wiring layer") is formed using Al or Cu or a layered film made mainly of Al or Cu. However, the material of the second wiring layer is not limited to these. An impurity-doped semiconductor layer (not illustrated in the drawings), formed of impurity-doped amorphous silicon or the like, is formed between the source electrodes 9 and the semiconductor active layers 8 and between the drain electrodes 13 and the semiconductor active layers 8. According to the above, the TFT switches 4 for switching are configured. In the TFT switches 4, the source electrodes 9 and the drain electrodes 13 may be opposite due to the polarities of the charges that are collected and accumulated by lower electrodes 11.

A TFT protection film layer 30 is formed over substantially the whole area of a region in which the pixels 20 are provided on the substrate 1 (almost the whole region), covering the second wiring layer. The TFT protection film layer 30 is for protecting the TFT switches 4, the signal lines 3 and a connection line 32. The TFT protection film layer 30 is formed of, for example, SiNx or the like, and is formed by, for example, CVD film formation.

A coated interlayer insulating film 12 is formed on the TFT protective film layer 30. The interlayer insulating film 12 is formed in a film thickness of 1 µm to 4 µm by a photosensitive organic material (e.g., a positive photosensitive acrylic resin: a material in which a naphthoquinone diazide positive photosensitizer is mixed together with a base polymer comprising a copolymer of methacrylic acid and glycidyl methacrylate) having a low permittivity (relative permittivity εr=2 to 4). Further, a contact 67 connected to the drain electrode 13 by a contact 68 is formed above the TFT protection layer 30.

In the radiation detector 10 according to the present exemplary embodiment, the capacitance between metals placed on top of and under the interlayer insulating film 12 is kept low by the interlayer insulating film 12. Further, usually this material also has a function as a planarizing film and also may planarize the steps formed below. In the sensor portion 103 of the radiation detector 10 according to the present exemplary embodiment, a contact hole 17 is formed at a position facing the interlayer insulating film 12 and the contact 67 connected to the drain electrode 13 above the TFT protection layer 30.

Lower electrodes 11 of the sensor portions 103 are formed on the interlayer insulating film 12 so as to cover the pixel regions while filling in the contact holes 17. The lower electrodes 11 are connected to the drain electrodes 13 of the TFT switches 4.

The lower electrodes 11 have virtually no restrictions in their material as long as the material is conductive in a case where later-described semiconductor layers 21 are thick around 1 µm. For this reason, the lower electrodes 11 may be formed using a conductive metal such as an Al material or ITO. On the other hand, in a case where the film thickness of the semiconductor layers 21 is thin (around 0.2 µm to 0.5 µm), light absorption may not be sufficient in the semiconductor layers 21. For this reason, in order to prevent an increase in leak current resulting from the application of the light to the TFT switches 4, it is preferable for the lower electrodes 11 to be formed using a layered film or an alloy made mainly of a light-blocking metal. Note that, in order to suppress light other than light illuminated from the scintillator 40 from being incident to the semiconductor layer 21, it is preferable for the lower electrode 11 to have light blocking properties. Accordingly, in the present exemplary embodiment, the lower electrode 11 is configured by an electrode having light blocking properties. Note also that, the lower electrode 11 of the present exemplary embodiment corresponds to the light blocking section of the present invention.

The semiconductor layers 21, which function as photodiodes, are formed on each lower electrodes 11. In the present exemplary embodiment, photodiodes with a PIN structure, in which an n+ layer, an i layer, and a p+ layer (n+ amorphous silicon, amorphous silicon, and p+ amorphous silicon) are layered, are employed as the semiconductor layers 21. The semiconductor layers 21 are formed by sequentially layering an n+ layer 21A, an i layer 21B, and a p+ layer 21C from the lower layer. The i layer 21B generates charges (a free electron and free hole pair) as a result of being light being applied to the i layer 21B. The n+ layer 21A and the p+ layer 21C function as contact layers, and electrically connect the i layer 21B to the lower electrode 11 and an upper electrode 22.

Upper electrodes 22 are individually formed on each of the semiconductor layers 21. A material whose light transmittance is high, such as ITO or IZO (indium zinc oxide), for example, is used for the upper electrodes 22.

A coated interlayer insulating film 23 is formed on the interlayer insulating film 12, the semiconductor layers 21, and the upper electrodes 22 so as to cover each of the semiconductor layers 21.

The common electrode lines 25 are formed on the insulation film 15 by Al or Cu or by an alloy or a layered film made mainly of Al or Cu. Each of the common electrode lines 25 is connected to the upper electrode 22 by a contact 66. A contact layer 70 is further formed above the scan line 101 and the common electrode line 25 that have the insulation film 15 disposed therebetween. The contact layer 70 is connected to the common electrode line 25 through a contact hole 72.

A connection line 76 is formed across from an upper portion of the interlayer insulating film 23 to an upper portion of the contact layer 70.

In the radiation detector 10 configured with the imaging pixels 20A formed as described above and the radiation detection pixels 20B, described later, a protective film is formed, if necessary, configured by an insulating material with low light absorption characteristics and the scintillator 40 configured from a material such as GOS is adhered to the front surface, using an adhesive resin with low light absorption.

As illustrated in FIG. 5, the radiation detection pixels 20B of the present invention are each equipped with one of the sensor portions 103, one of the TFT switches 4, and one of the detection TFTs 60. In the radiation detection pixels 20B, similarly to the imaging pixels 20A, charges that have been generated in the semiconductor layer 21 of each of the sensor portions 103 are read out by the signal line 3, according to the ON/OFF state of the TFT switch 4. Since the cross-sectional view taken on line A-A including the TFT switch 4 is a similar to that of the imaging pixels 20A (see FIG. 4), further explanation is omitted.

The detection TFT 60 of each of the radiation detection pixels 20B of the present exemplary embodiment is configured substantially similar to the TFT switch 4, however there is no gate terminal disposed in the detection TFT 60. As illustrated in FIG. 6, in the detection TFT 60, a semiconductor active layer 61 is formed directly on the insulation film 15, and functions as a photo-transistor (photo-sensor). Accordingly, a sensor portion 103 (semiconductor layer 21 and lower electrode 11) is not formed at the upper region of each of the detection TFTs 60, and the light is illuminated directly from the scintillator 40 onto the semiconductor active layer 61. The source electrode 62 of the detection TFT 60 is connected to the signal line 3. The drain electrode 64 thereof is connected to the common electrode line 25, such that a bias voltage (minus voltage) is applied directly to the detection TFT 60. Namely, the detection TFT 60 is maintained in a minus clamped state due to the bias voltage.

Figure 7:
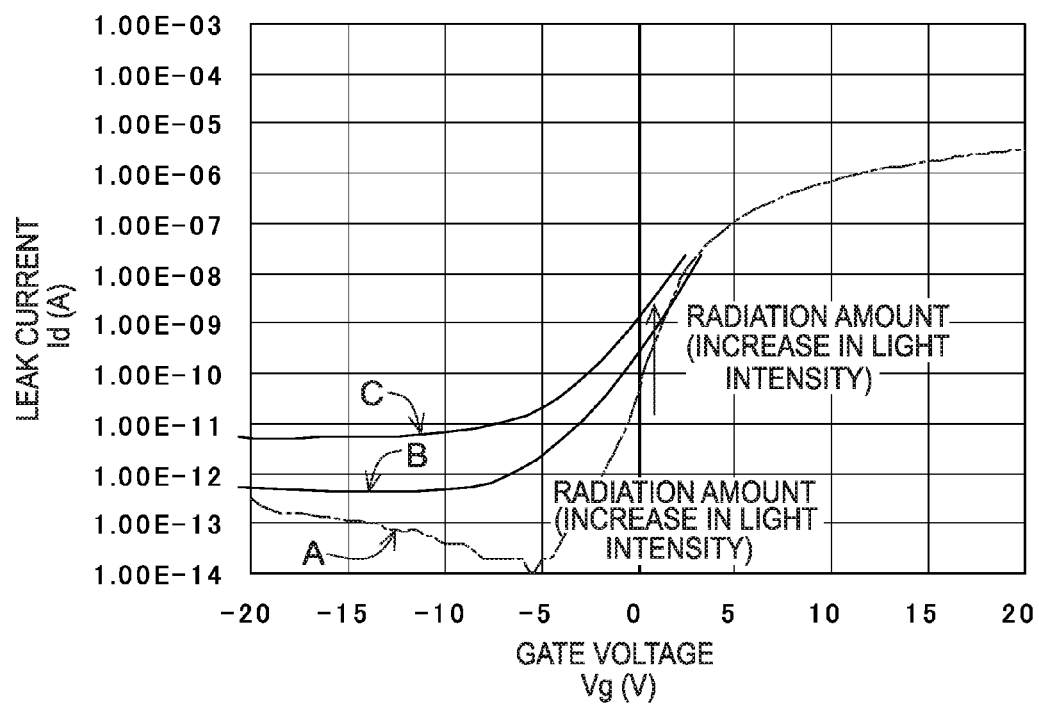
FIG. 7 is an explanatory diagram to explain specific examples of relationships between the gate voltage Vg and the leak current of a detection TFT.

In this state, when light from the scintillator 40 is illuminated onto the semiconductor active layer 61 of each of the detection TFTs 60, the off leak value of the detection TFT 60 becomes higher, and the leak current increases. The leak current is conducted into the signal line 3 by the source electrode 62. The detection TFT 60 outputs greater leak current amount when greater intensity of light is illuminated (the leak current value becomes higher). Namely, more leak current flows the greater the amount of irradiated radiation (the greater the energy intensity). Specific examples are illustrated in FIG. 7 of relationships between gate voltage Vg of the detection TFT 60 (Vg=0V in the present exemplary embodiment) and leak current. In FIG. 7, line A illustrates a case in which the irradiated radiation amount (the light intensity converted by the scintillator 40) has a small energy intensity. Further, line B illustrates an example in which the irradiated radiation amount (light intensity) is greater and has higher energy intensity than in case A. Furthermore, line C illustrates a case in which the irradiated radiation amount (light intensity) is greater and has higher energy intensity than in case B. As illustrated in FIG. 7, the leak current generated increases (there is more leak current) as the irradiated radiation amount (light intensity) increases. Note that, in cases in which a gate electrode is provided to the detection TFT 60 (details follow later), when the voltage applied to the gate electrode is a high voltage, the current value of the leak current becomes saturated. However, when, as in the present exemplary embodiment, there is no gate electrode provided (Vg=0V), the generated leak current becomes greater with increasing irradiated radiation amount (light intensity).

Since a corresponding relationship between the irradiated radiation amount (light intensity) and the leak current (charges) generated in the detection TFT 60 and flown into the signal line 3 exists, the timing of the start of irradiation of radiation may be detected by monitoring the current value of the leak current using the control section 106.

Figure 8:
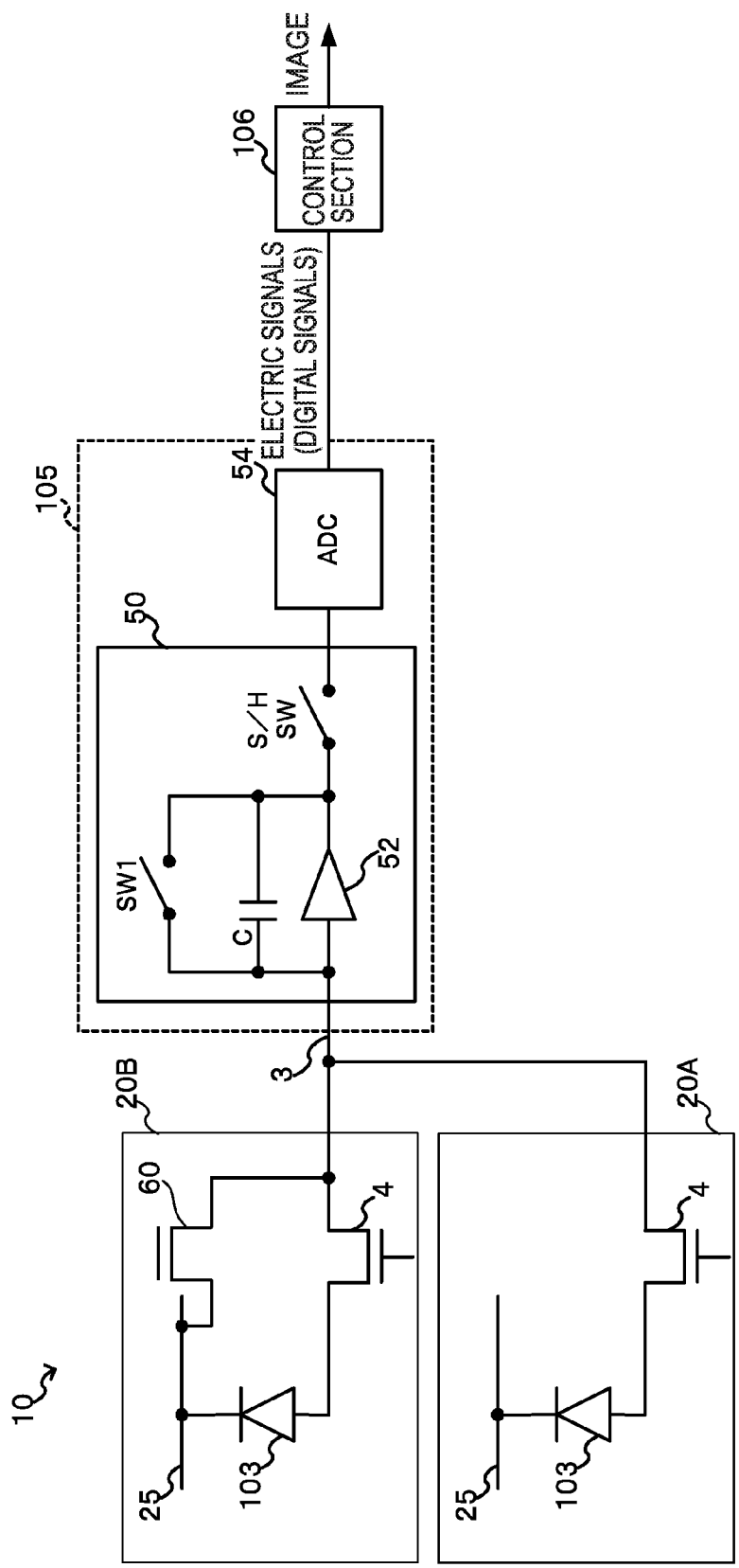
FIG. 8 is schematic configuration diagram illustrating an outline configuration of a signal detection circuit of a radiographic imaging device according to the first exemplary embodiment.

Next, explanation is given regarding a schematic configuration of each of the signal detection circuits 105 of the present exemplary embodiment. FIG. 8 is a schematic configuration diagram showing an example of the signal detection circuit 105 of the present exemplary embodiment. The signal detection circuit 105 according to the present exemplary embodiment is configured with the amplification circuit 50 and an analogue-to-digital converter (ADC) 54. Note that, while simplified in the drawing of FIG. 8, one of the amplification circuits 50 is provided for each of the signal lines 3. Namely, the signal detection circuit 105 is provided with the same plural number of amplification circuits 50 as the number of signal lines 3 of the radiation detector 10.

Each of the amplification circuits 50 is configured by a charge amplifier circuit, and includes an amplifier 52 such as an operational amplifier, a condenser C connected in parallel to the amplifier 52, and a switch SW1 employed for charge resetting also connected in parallel to the amplifier 52.

The amplification circuits 50 are configured such that respective charges (electric signals) from the pixels 20 (the imaging pixels 20A and the radiation detection pixels 20B) are read when the charge reset switch SW1 is in the OFF state. Charges that have been read are accumulated in the condenser C, and the voltage value output from the amplifier 52 increases according to the charge amount accumulated.

The control section 106 applies charge reset signals to the charge reset switch SW1 so as to control the ON and OFF states of the charge reset switch SW1. The input side and the output side of the amplifier 52 are shorted when the charge reset switch SW1 is in the ON state, and the charges of the condenser C are discharged.

When a sample and hold (S/H) switch SW is in an ON state, the ADC 54 functions to convert electric signals that are analogue signals input from the amplification circuits 50 into digital signals. The ADC 54 outputs the digitally converted electric signals (image data) in sequence to the control section 106.

The ADC 54 according to the present exemplary embodiment is input with electric signals that have been output from all of the amplification circuits 50 provided to each of the signal detection circuits 105. Namely, each of the signal detection circuits 105 of the present exemplary embodiment is provided with a single ADC 54, irrespective of the number of the amplification circuits 50 (the number of the signal lines 3).

In the control section 106, specific processing such as noise reduction and gain correction is performed on the electric signals (image data) of the digital signals, output from the signal detection circuit 105, so as to generate a radiographic image expressing the irradiated radiation.

Figure 9:
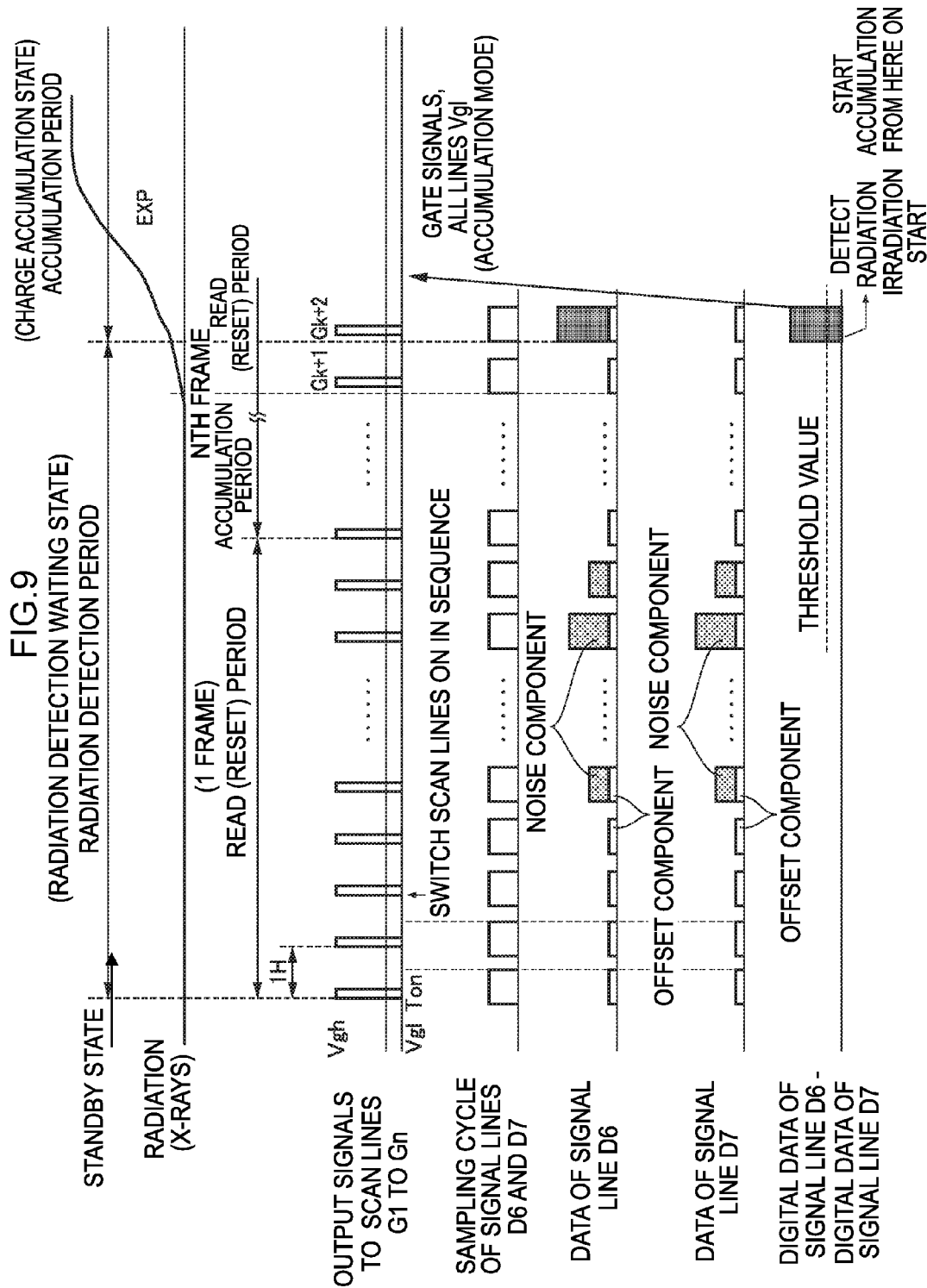
FIG. 9 is a timing chart illustrating the flow of operations of a radiographic imaging device according to the first exemplary embodiment.

Explanation follows regarding the flow of operations when imaging a radiographic image with the radiographic imaging device 100 of the present exemplary embodiment, as illustrated in FIG. 9. FIG. 9 is a timing chart illustrating the flow of operations when imaging a radiographic image with the radiographic imaging device 100.

In the radiographic imaging device 100 of the present exemplary embodiment, after being in a standby state, enters an imaging mode for imaging a radiographic image, transition is made to a radiation detection period which is a radiation detection waiting state. In the present exemplary embodiment, in the radiation detection period, the control section 106 controls each of the scan signal control circuits 104 such that scan signals are output from the scan signal control circuits 104 at a specific cycle H to each of the scan lines 101 in sequence one line at a time. Each of the TFT switches 4 connected to the respective scan lines 101 is accordingly switched into an ON state in sequence one line at a time, and reset operation is performed that read out the charges accumulated in each of the pixels 20 of the radiation detector 10.

During the radiation detection period, at a specific cycle Ts, the electric signals flowing in the signal lines 3 that are connected to the radiation detection pixels 20B (such as D6 in the example of FIG. 2) and the electric signals flowing in the signal lines 3 that are not connected to the radiation detection pixels 20B (such as D7 in the example of FIG. 2) are converted, by each of the signal detection circuits 105, into digital signals, and sampling to detect the radiation is repeatedly performed with a sampling period Tca. In the signal detection circuit 105, the electric signals flowing in the D6 signal line 3 and the D7 signal line 3 are amplified with their respective amplification circuit 50, and are converted into digital signals before outputting to the control section 106.

The present exemplary embodiment is configured such that, a single frame=specific cycle H×n (wherein n is the number of the scan lines 101 for a single frame, n=8 in FIG. 2), and sampling period Tca≤specific cycle H=1 frame/n.

The control section 106 subtracts the value of the digital signals, converted by the signal detection circuit 105, of the D7 signal line 3 to which the radiation detection pixels 20B are not connected, from the value of the digital signals of the D6 signal line 3 to which the radiation detection pixels 20B are connected. Then, the control section 106 compares the value of the subtracted digital signals against a predetermined threshold value for detecting the start of irradiation of radiation, and determines whether the irradiation of radiation has started, based on whether the value of the subtracted digital signals is the threshold value or greater.

When noise caused by external disturbance is generated in each of the signal lines 3, substantially the same amount of noise is generated in the D6 and D7 signal lines 3 due to the D6 and D7 signal lines 3 being adjacent to each other. Electric signals from the radiation detection pixels 20B also flow in the D6 signal line 3 when radiation has been irradiated.

Consequently, the value of the noise component may be cancelled out by converting the electric signals flowing in the D6 and D7 signal lines 3 into digital signals and subtracting the value of the converted digital signals of the D7 signal line 3 from the value of the converted digital signals of the D6.

Note that, detection of whether radiation has been irradiated, by the control section 106, is not limited to comparison with the threshold value for detecting the start of irradiation of radiation. Detection may, for example, be performed by detecting based on pre-set conditions such as the number of detection times. In the present exemplary embodiment, as described above, in order to cancel the value of noise components, digital signals are employed that have been derived by subtracting from the digital signals of a given signal line 3 to which the radiation detection pixels 20B are connected, the digital signals of one of the signal lines 3 to which the radiation detection pixels 20B are not connected that is disposed adjacent to the given signal line 3. However, there is no limitation thereto and, for example, configuration may be made simply employing the digital signals of the signal line 3 to which the radiation detection pixels 20B are connected.

As explained above, in the radiation detector 10 of the present exemplary embodiment, each of the radiation detection pixels 20B includes the detection TFT 60, and the light converted from radiation is directly illuminated from the scintillator 40 onto the detection TFT 60. A leak current is thereby generated by the semiconductor active layer 61 of the detection TFT 60 according to the amount of the illuminated light (intensity), and the leak current flows into the signal line 3. Thus, radiation may be detected by monitoring the leak current, and timings such as the start of irradiation of radiation may be detected.

In the present exemplary embodiment, the radiation detector 10 is configured such that the radiation detection pixels 20B also include the sensor portion 103. In a case in which an element for detecting radiation is configured with no sensor portion 103 provided in the radiation detection pixels (20B) (for example such as with only a photo-sensor), when imaging a radiographic image, since charges generated according to the radiation irradiation amount cannot be accumulated, the radiation detection pixels (20B) become defective pixels, resulting in point defects. In such cases, correction is performed using the data (image data) of the peripheral imaging pixels (20A). However, there is a limit to the number and position when disposing such radiation detection pixels (20B) that causes the point defects, since a drop in radiographic image quality arises when plural point defects are present.

However, in the present exemplary embodiment, when imaging radiographic images, since the charges generated according to the irradiated radiation can be accumulated in the sensor portions 103 of the radiation detection pixels 20B, image data can be acquired with the radiation detection pixels 20B. Accordingly, the present exemplary embodiment may prevent the radiation detection pixels 20B from becoming point defects. In the radiation detection pixels 20B, the surface area of the region of the sensor portion 103 (the semiconductor layer 21), onto which radiation is irradiated, is smaller than that of the imaging pixels 20A (compare FIG. 3 and FIG. 5). However, by performing gain correction on the image data, output from the radiation detection pixels 20B, based on the surface area of the irradiation region (the charge amount being generated according to surface area), the difference in surface area may be prevented from leading to point defects. Since this enables more of the radiation detection pixels 20B to be disposed inside the radiation detector 10, the start of irradiation of radiation irradiation may be detected with good precision.

In the radiographic imaging device of the present exemplary embodiment, charges used for imaging the radiographic images output to the signal lines 3 by the TFT switches 4, and charges for radiation detection output by the detection TFTs 60 of the radiation detection pixels 20B can be read by using the same amplification circuits (the amplifiers 52) 50. Consequently, there is no need to provide separate amplification circuits 50 for the radiation detection. Since the same signal lines 3 may also be used, there is no need to provide dedicated signal lines separate for radiation detection. Consequently, an enhanced S/N ratio may be achieved by increasing the fill factor.

Further, the present exemplary embodiment is configured such that the light converted from radiation by the scintillator 40 incident on both the semiconductor layers 21 of the sensor portions 103, and on the semiconductor active layers 61 of the detection TFTs 60. For example, JP-A No. 2010-56396 discloses a technology for introducing light from the different scintillators. When a technology as disclosed in JP-A No. 2010-56396 is employed in which light is introduced from a scintillator for the sensor portions 103 (the semiconductor layers 21) different to the scintillator for the detection TFTs 60 (the semiconductor active layers 61), differences arise in the sensitivity to irradiated radiation of the sensor portions 103 (the semiconductor layers 21) and the sensitivity of the detection TFTs 60 (the semiconductor active layers 61). In such conventional technology, when irradiated radiation of high energy is employed, the difference in sensitivity between the sensor portions 103 and the detection TFTs 60 becomes small. However, when irradiated radiation of low energy is employed, the difference in sensitivity between the sensor portions 103 and the detection TFTs 60 becomes large. However, in contrast thereto, with the radiation detector 10 of the present exemplary embodiment, a mismatch (difference) between the sensitivity of the sensor portions 103 (the semiconductor layers 21) to irradiated radiation and the sensitivity of the detection TFTs 60 (the semiconductor active layers 61) may be suppressed by introducing light from the same scintillator 40.

Figure 10:
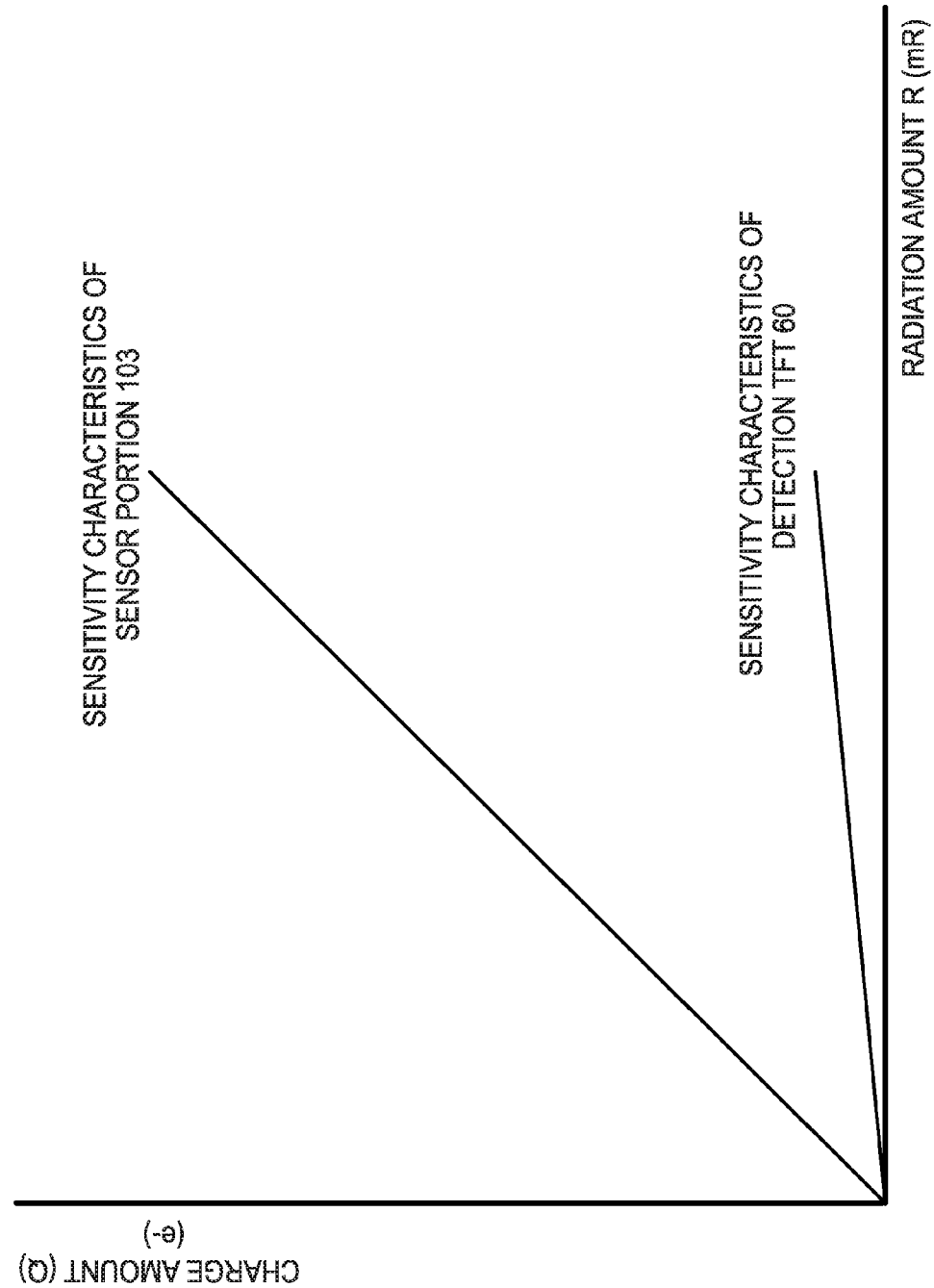
FIG. 10 is a graph to explain sensitivity characteristics (relationship between the irradiated radiation amount and the charge amount generated (the charge amount of leak current)) of a detection TFT and the sensor portion of a pixel of the radiation detector according to the first exemplary embodiment.

The sensitivity characteristics (relationship between the irradiated radiation amount and the charge amount occurring (the charge amount of leak current)) for the sensor portions 103 and the detection TFT 60s of the present exemplary embodiment are illustrated in FIG. 10. When the generated charge amount is denoted as Q (Q1, Q2), the irradiated radiation amount is denoted as R, and a coefficient as K (K1, K2), the sensitivity characteristics of the sensor portions 103 may be expressed as $Q1=K1\times R$, and the sensitivity characteristics of the detection TFTs 60 may be expressed as $Q2=K2\times R$.

As illustrated in FIG. 10, the sensitivity characteristics of the detection TFTs 60 are lower than the sensitivity characteristics of the sensor portions 103, due to the semiconductor layers 21 not being provided between the detection TFTs 60 and the scintillator 40 (i.e., the charge amount occurring is less for the same radiation amount). However, in the present exemplary embodiment, since the sensor portions 103 and the detection TFTs 60 shows similar sensitivity characteristics (substantially the same as each other), a configuration may be achieved in which the ratio of the charge amount occurring in the sensor portions 103 to the charge amount occurring in the detection TFTs 60 due to the leak, current does not change, even when the irradiated radiation energy changes. Accordingly, in the present exemplary embodiment, radiation may be detected with good precision by using the detection TFTs 60, enabling detection of the start of irradiation of radiation. Note that, even when there is a slight difference in sensitivity characteristics between the sensor portions 103 and the detection TFTs 60, such a difference is of a level that does not cause any affection, since the sensitivity characteristics may be treated as being similar, and any difference is at least smaller than the difference in sensitivity characteristics arising in the above conventional technology.

Furthermore, light from the scintillator 40 may be efficiently made to be incident to both the sensor portions 103 (the semiconductor layers 21) and the detection TFTs 60 (the semiconductor active layers 61), since electrode with light-blocking properties is used as the lower electrode 11. Hence, the present exemplary embodiment may detect the radiation with even better precision by using the detection TFTs 60, and may detect the start of irradiation of radiation irradiation start with greater precision.

There are no particular limitations to the position and number of the radiation detection pixels 20B provided, and position and number may be determined according to such factors as the desired radiation detection precision, and the size and specification of the radiation detector 10.

Figure 11:
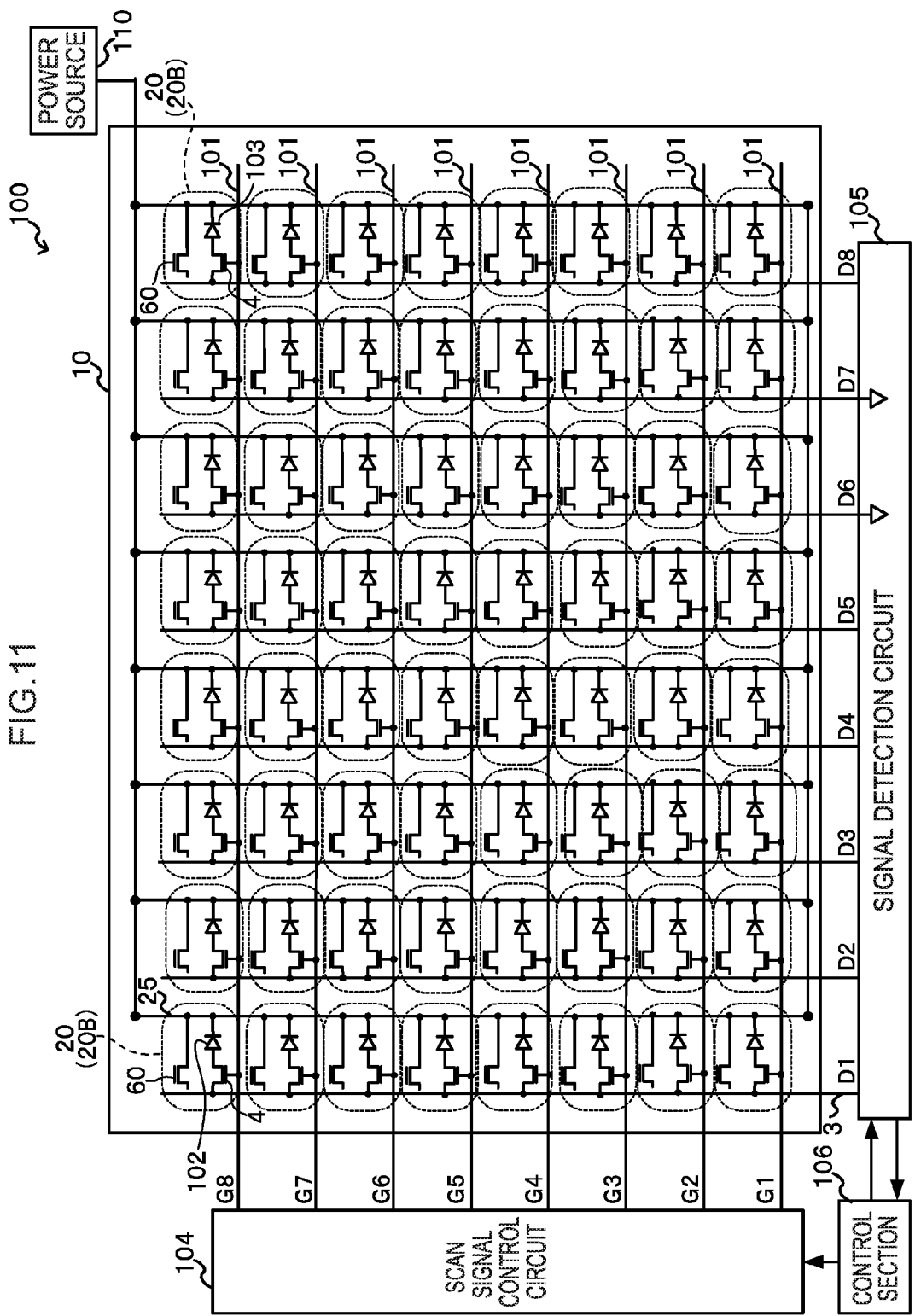
FIG. 11 is a configuration diagram illustrating a different example of an overall configuration of a radiographic imaging device according to the first exemplary embodiment.

In the present exemplary embodiment, the pixels 20 are configured with the imaging pixels 20A and the radiation detection pixels 20B. However the present invention is not limited thereto. For example, configuration may be made with only radiation detection pixels 20B, as illustrated in FIG. 11. When all of the pixels 20 are configured the same, defections (errors) can be prevented from being detected with the radiation detection pixels 20B that arise due to differences from the shape (pattern) of the imaging pixels 20A when, for example, performing testing of the radiation detector 10 using a testing device. Accordingly, limitations of a testing device (for example an optical testing device) may be avoided. Furthermore, when there are large differences between the shape (pattern) of the imaging pixels 20A and the shape (pattern) of the radiation detection pixels 20B, a repeating patterned mask may not be employed as a mask for fabricating the radiation detector 10, and may increase the complexity of fabrication. However, in the present exemplary embodiment, fabrication may be facilitated, since repeating the patterned mask may be employed. Consequently, the present exemplary embodiment may avoid the limitations in fabrication of the radiation detector 10.

Second Exemplary Embodiment

Explanation follows regarding a second exemplary embodiment.

Since a radiographic imaging system 200 and a radiographic imaging device 100 of the present exemplary embodiment have substantially the same configuration and operation as the radiographic imaging system 200 and the radiographic imaging device 100 of the first exemplary embodiment, similar portions are denoted with same reference numerals and further explanation thereof is omitted.

Since the configuration of imaging pixels 20A of the radiation detector 10 differs in the present exemplary embodiment, the differing configuration will be explained.

Figure 12:
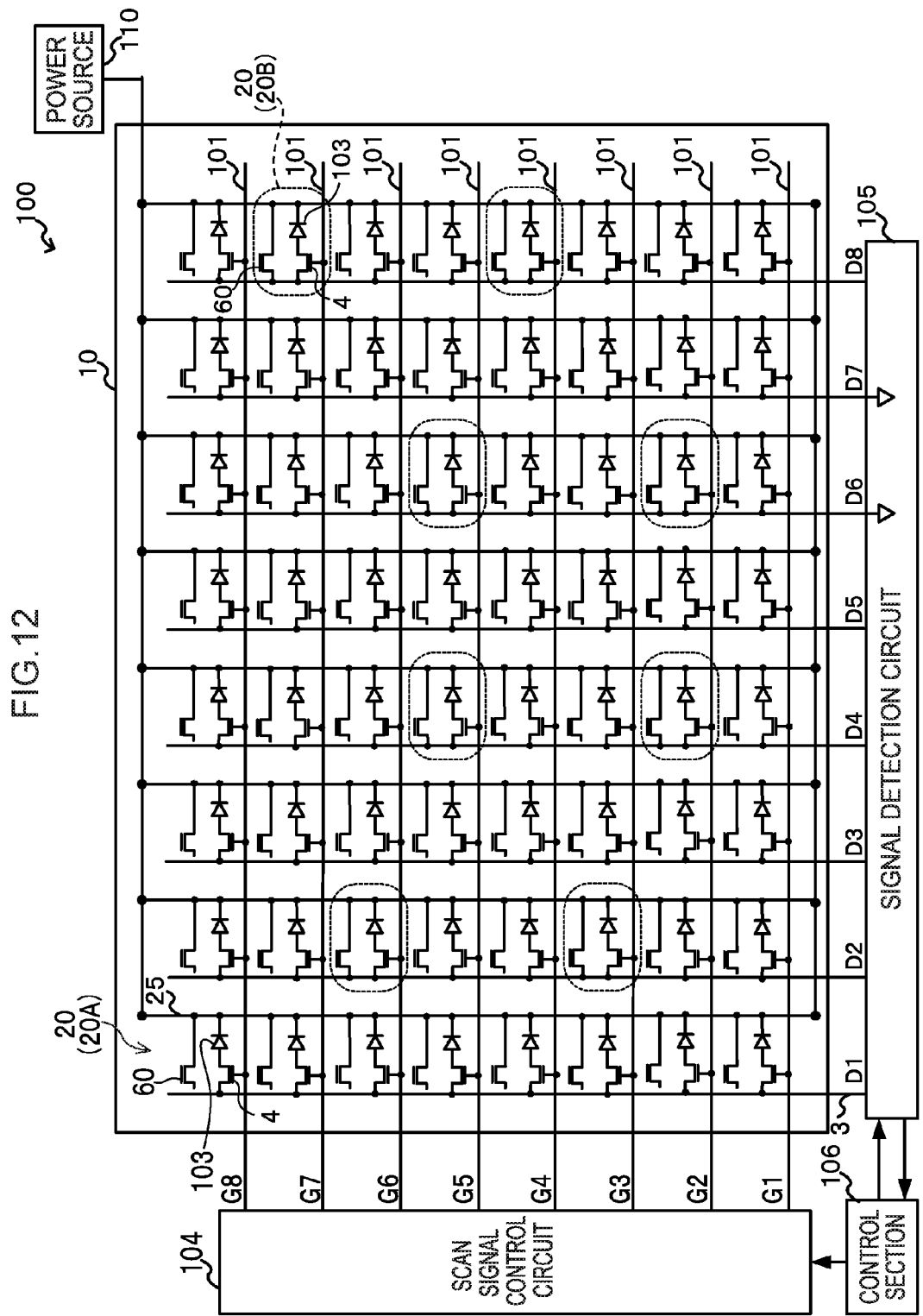
FIG. 12 is a configuration diagram illustrating an overall configuration of a radiographic imaging device according to a second exemplary embodiment.
Figure 13:
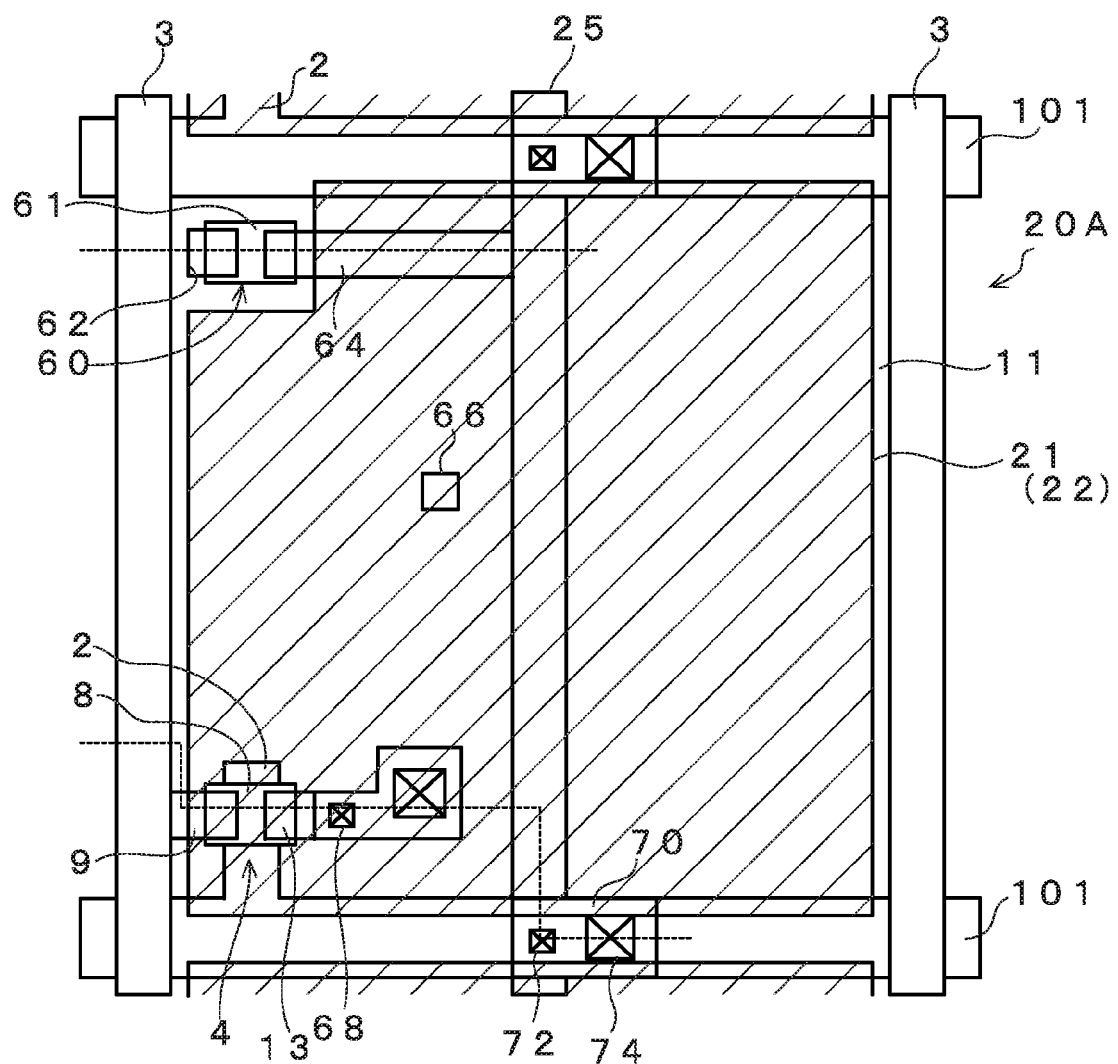
FIG. 13 is a plan view illustrating a configuration of an imaging pixel according to the second exemplary embodiment.

FIG. 12 is a configuration diagram illustrating an example of an overall configuration of a radiographic imaging device according to the present exemplary embodiment. FIG. 13 is a plan view illustrating an example of a structure of the imaging pixels 20A, according to the present exemplary embodiment. The configuration of the imaging pixels 20A of the present exemplary embodiment is similar to the radiation detection pixels 20B, however in comparison to the imaging pixels 20A, the radiation detection pixels 20B each have a rectangular shaped cut away portion in the sensor portion 103 (the semiconductor layer 21). A detection TFT 60 is provided at the cut away portion. The source electrode 62 of the detection TFT 60 is formed so as not to be connected to the signal line 3 (in a disconnected line state). Namely, the imaging pixels 20A are provided with similarly configured detection TFTs 60 to those of the radiation detection pixels 20B, except in that the source electrodes 62 are not connected to the signal lines 3. Leak current occurs in the detection TFTs 60 of the imaging pixels 20A according to irradiation of radiation (according to light from the scintillator 40) similarly to in the detection TFTs 60 of the radiation detection pixels 20B. However since each of the source electrodes 62 and the signal line 3 are not connected to each other, the generated leak current does not flow into the signal line 3. Since only charges generated in the sensor portions 103 are read by the TFT switch 4 and output to the signal lines 3, the imaging pixels 20A accordingly do not function as radiation detection pixels, and only output during radiographic imaging.

Note that, the location of the disconnected line is not limited to that of the present exemplary embodiment, and a disconnected line may be configured somewhere in the drain electrode 13, or may be configured in the vicinity of the semiconductor layer 21. A location of the disconnected line may be determined according to such factors as the limitations and specification for fabrication and/or testing of the radiation detector 10.

On the other hand, since the radiation detection pixels 20B are configured (patterned) similarly to those of the first exemplary embodiment, the radiation detection pixels 20B of the present exemplary embodiment have functionality for detecting the radiation and may be employed for detecting the start of irradiation of the radiation.

Thus, the present exemplary embodiment is able to perform appropriate radiation detection, similarly to the first exemplary embodiment, while also having imaging pixels 20A and radiation detection pixels 20B that are configured similarly to each other. Accordingly, the limitations to testing devices (such as an optical testing device) and the limitations to fabrication referred to above may be avoided.

Note that, when performing AEC, it is preferable to detect the radiation irradiated onto a specific location (pixels at a specific location). In such case, the present exemplary embodiment may be preferably employed, since the radiation detection pixels 20B may be placed only at the specific location, and since the imaging pixels 20A and the radiation detection pixels 20B may be configured (patterned) similarly to each other.

Third Exemplary Embodiment

Explanation follows regarding a third exemplary embodiment.

Since a radiographic imaging system 200 and a radiographic imaging device 100 of the present exemplary embodiment have substantially similar configuration and operation to the radiographic imaging system 200 and the radiographic imaging device 100 of the first exemplary embodiment, explanation is omitted of similar portions thereof. The output destination of the leak current occurring in detection TFTs 60 of radiation detection pixels 20B of radiation detector 10 of the present exemplary embodiment, differs from the output destination of the leak current occurring in detection TFTs 60 of radiation detection pixels 20B of radiation detector 10 of the first exemplary embodiment, and so the differing configuration will be explained.

Figure 14:
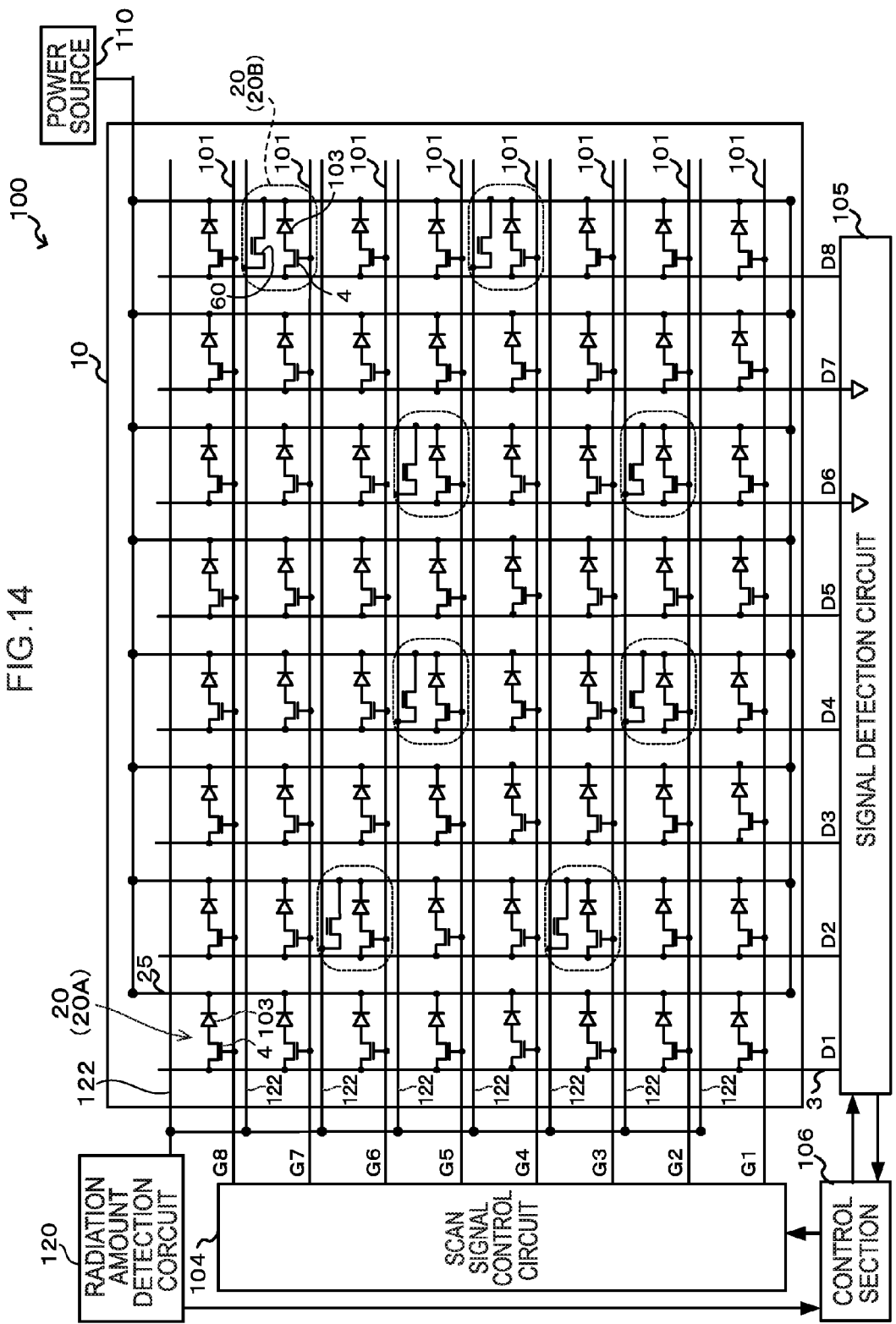
FIG. 14 is a configuration diagram illustrating an overall configuration of a radiographic imaging device according to a third exemplary embodiment.

FIG. 14 is a configuration diagram of an example of an overall configuration of the radiographic imaging device 100 (radiation detector 10) of the present exemplary embodiment. As illustrated in FIG. 14, in the radiation detector 10 of the present exemplary embodiment, radiation detection signal lines 122 are provided for outputting leak current generated in the detection TFT 60, separately to the scan lines 101, and are connected to the detection TFTs 60 of the radiation detection pixels 20B in parallel to the scan lines 101. In the present exemplary embodiment, a radiation amount detection circuit 120 for detecting the radiation irradiation amount is connected to the radiation detection signal lines 122. The radiation amount detection circuit 120 detects the total irradiation amount of radiation, by, for example, summing individual radiation irradiation amounts. The control section 106 then detects the start of irradiation of radiation based on the radiation amount detected by the radiation amount detection circuit 120.

Consequently, in the present exemplary embodiment, mixing of charges may be prevented due to providing the radiation detection signal lines 122 to which the leak current (charges) for detecting the start of irradiation of radiation is output from the detection TFTs 60 of the radiation detection pixels 20B, separately to the signal line 3 in which charges for imaging flow. Accordingly, the present exemplary embodiment may achieve precise radiation detection, and may enhance the quality of radiographic images.

Fourth Exemplary Embodiment

Explanation follows regarding a fourth exemplary embodiment.

Since a radiographic imaging system 200 and a radiographic imaging device 100 of the present exemplary embodiment have substantially similar configuration and operation to the radiographic imaging system 200 and the radiographic imaging device 100 of the first exemplary embodiment explanation is omitted of similar portions thereof. The configuration of radiation detection pixels 20B of the present exemplary embodiment differs from the configuration of the radiation detection pixels 20B of the first exemplary embodiment, and so the differing configuration will be explained.

Figure 15:
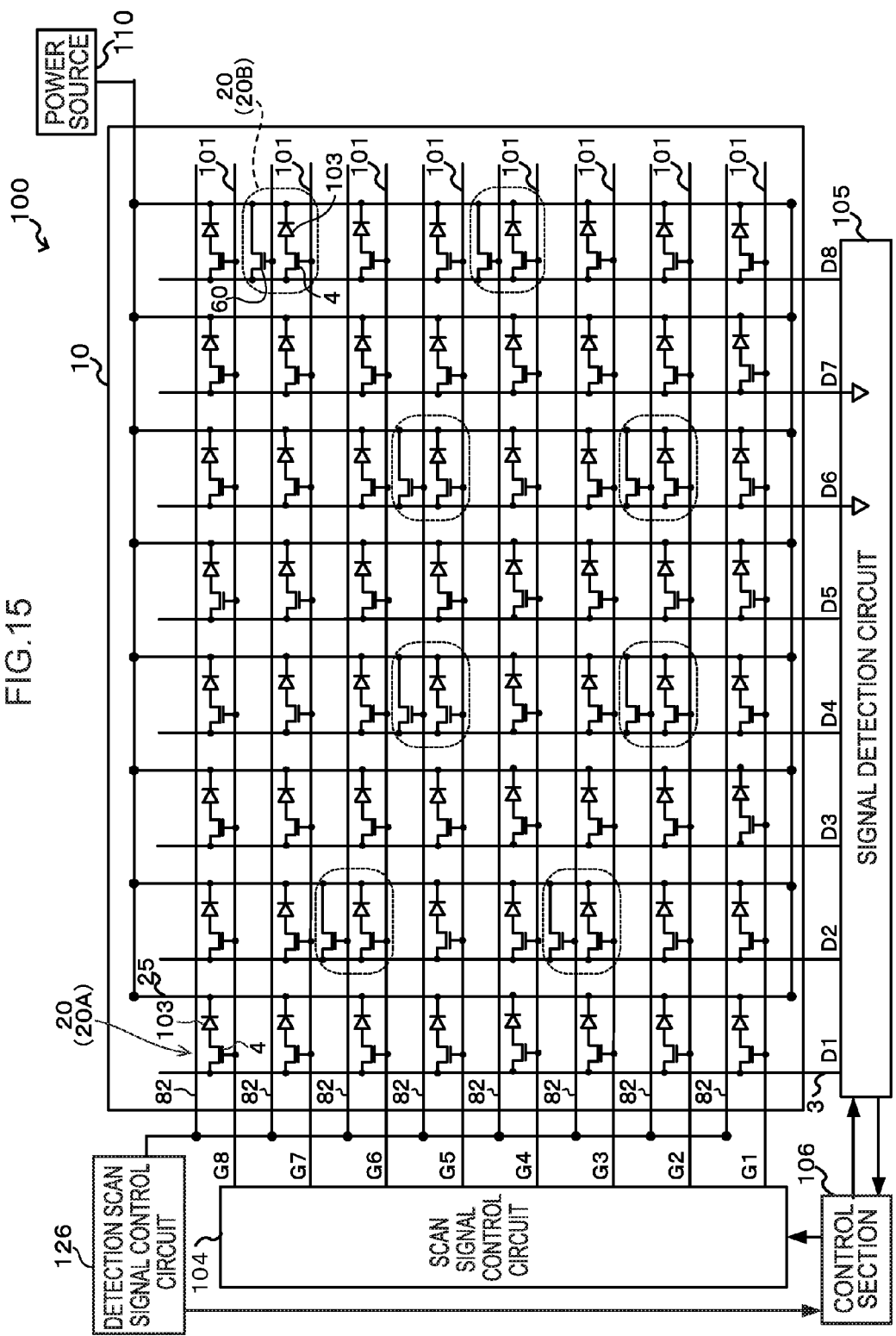
FIG. 15 is a configuration diagram illustrating an overall configuration of a radiographic imaging device according to a fourth exemplary embodiment.
Figure 16:
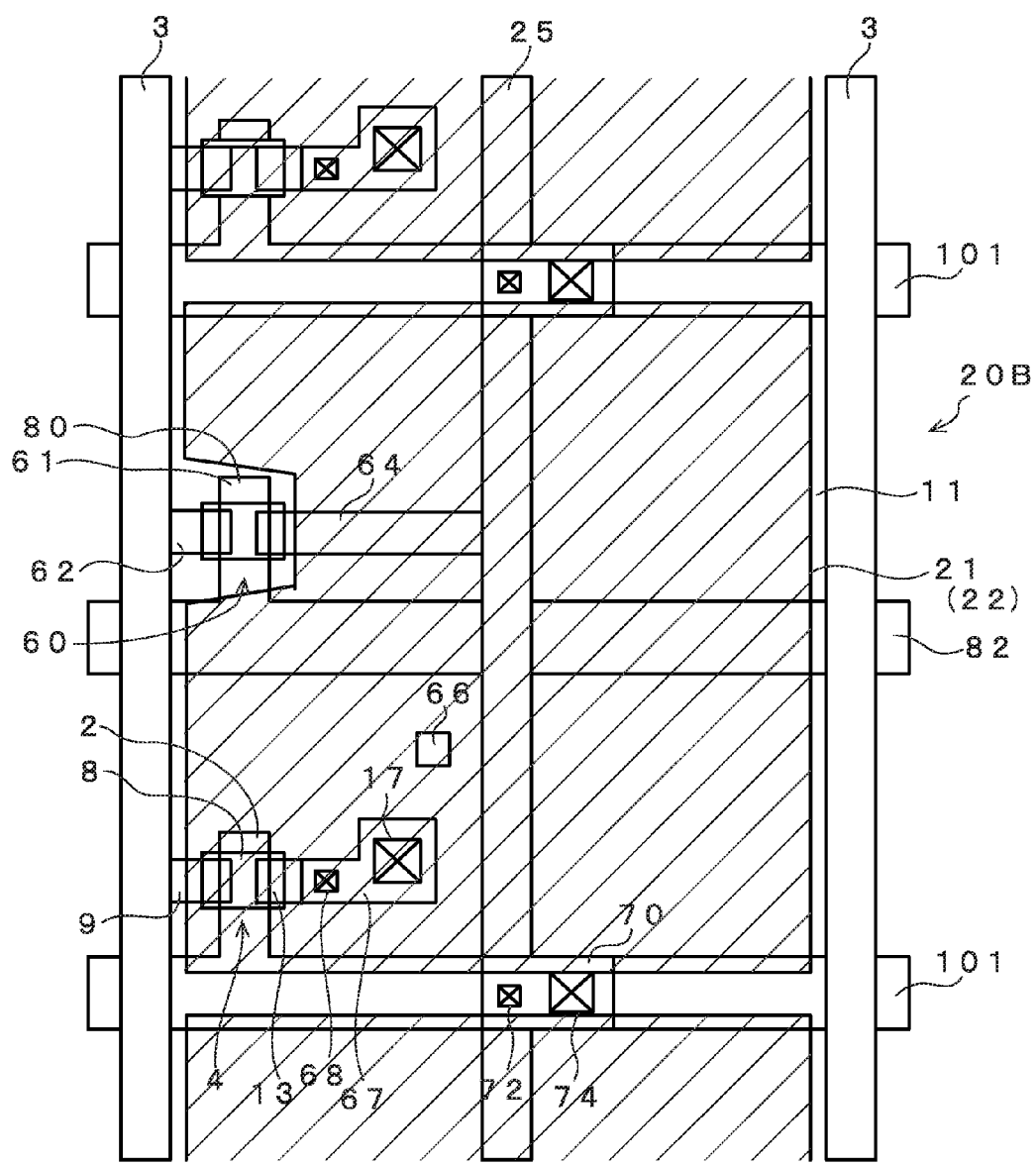
FIG. 16 is a plan view illustrating a configuration of a radiation detection pixel according to the fourth exemplary embodiment.

FIG. 15 is a configuration diagram illustrating an example of the overall configuration of a radiographic imaging device 100 (radiation detector 10) of the present exemplary embodiment. FIG. 16 is a plan view illustrating a structure of a radiation detection pixel 20B according to the present exemplary embodiment.

In the present exemplary embodiment, similarly to in the first exemplary embodiment, the radiation detection pixels 20B are each equipped with a detection TFT 60. However, in the present exemplary embodiment, the detection TFTs 60 each includes a gate electrode 80, and the gate electrode 80 is connected to a detection control line 82.

As illustrated in FIG. 15 and FIG. 16, in the radiation detector 10 of the present exemplary embodiment, detection control lines 82 are provided separately to the scan lines 101, the running parallel to the scan lines 101 and are connected to the gate electrodes 80 of the detection TFTs 60 of the radiation detection pixels 20B. In the present exemplary embodiment, a detection scan signal control circuit 126 is connected to the detection control lines 82 for outputting a detection scan signal to apply a voltage to the gate electrodes 80 of the source electrodes 62 of the radiation detection pixels 20B, under control of the control section 106.

In the leak current generated in the detection TFTs 60, there are cases in which extremely large and a great amount of noise is incorporated. In such cases, the leak current amount flowing in the signal lines 3 may be reduced by applying an OFF voltage to the gate electrodes 80 of the detection TFTs 60 (a voltage to switch the gates of the detection TFTs 60 OFF, as a specific example −10V to −5V). In the present exemplary embodiment, by continuously applying the OFF voltage to the gate electrodes 80, the leak current when light (radiation) is not being illuminated (irradiated) may be reduced in comparison to cases where the OFF voltage is not applied. As a specific example, the current value of the leak current may be reduced by about 3 decimal places, reducing the leak current to the order of fA.

Accordingly, the present exemplary embodiment may reduce the leak current amount, and therefore noise reduction may be achieved. Therefore, the present exemplary embodiment may perform the radiation detection with even higher precision. Note that, during radiographic imaging, it is preferable to continuously apply the OFF voltage to the gate electrodes 80 in order to output the generated leak current (charges) and the charges generated in the sensor portion 103 to the signal line 3.

Note that, in the present exemplary embodiment, explanation has been given of an example in which the OFF voltage is applied as a detection scan signal to the gate electrodes 80 from the detection scan signal control circuit 126, using the detection control lines 82. However the detection scan signal does not always have to be the OFF voltage. Configuration may be made such that, by applying a voltage to the gate electrodes 80, the leak current amount output from the signal lines 3 is adjusted so as to output a desired leak current amount (for example a predetermined leak current amount matched to desired radiation detection sensitivity) when a specific radiation amount (light intensity) is irradiated.

Note that, in the present exemplary embodiment, likely to the reset operation preformed in the first exemplary embodiment in the radiation detection period to extract the charges that have accumulated in each of the pixels 20, the control section 106 controls the detection scan signal control circuit 126 so as to perform a refresh operation. Namely, the detection scan signals are output from the detection scan signal control circuit 126 in sequence one line at a time, so as to cause the detection scan signal to be output to each of the detection control lines 82 with a specific cycle. Accordingly, each of the detection TFTs 60 connected to each of the detection control lines 82 is switched into the ON state one line at a time, extracting leak current (charges) of the detection TFTs 60 so as to perform the refresh operation. Such refresh operation is preferably performed, for example, periodically once every time interval or once every several time intervals, according the performance characteristics of the detection TFTs 60.

Note that, the radiation detector 10 of the present exemplary embodiment may also be configured as in the above second exemplary embodiment and third exemplary embodiment.

The radiographic imaging device 100 of the present exemplary embodiment may, similarly to in the second exemplary embodiment, be configured with radiation detection pixels 20B employed for all of the pixels 20 of the radiation detector 10. Further, The radiographic imaging device 100 of the present exemplary embodiment may, similarly to in the third exemplary embodiment, be provided with radiation amount detection circuit 120 and radiation detection signal lines 122, and with the detection TFTs 60 of the radiation detection pixels 20B connected to the radiation detection signal lines 122 instead of to the signal lines 3.

Fifth Exemplary Embodiment

Explanation follows regarding a fifth exemplary embodiment.

Since a radiographic imaging system 200 and a radiographic imaging device 100 of the present exemplary embodiment have substantially similar configuration and operation to the radiographic imaging system 200 and the radiographic imaging device 100 of the first exemplary embodiment, explanation is omitted of similar portions thereof. The configuration of the radiation detection pixels 20B of the present exemplary embodiment differs from the configuration of the radiation detection pixels 20B of the first exemplary embodiment, and so the differing configuration will be explained.

Figure 17:
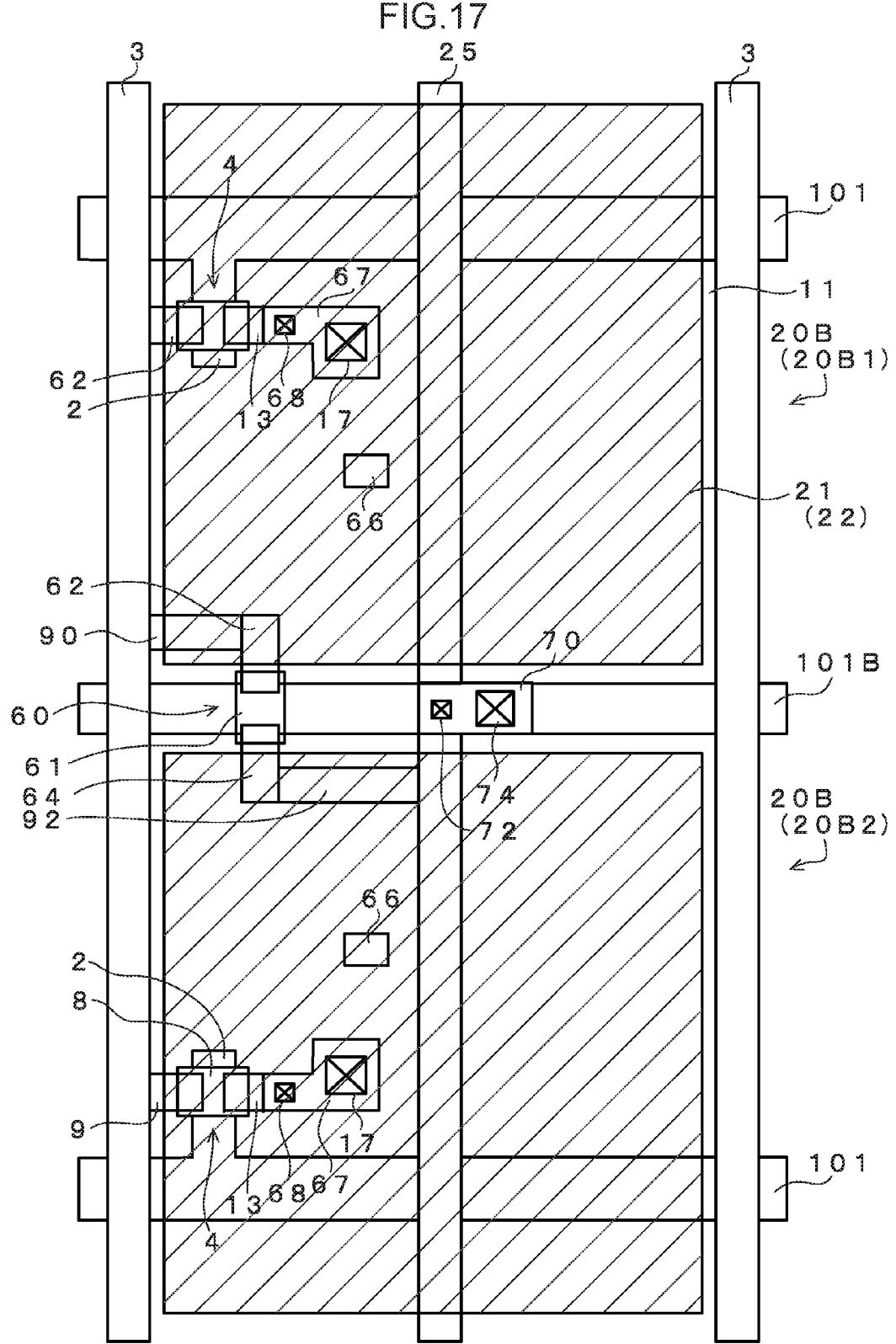
FIG. 17 is a plan view illustrating a configuration of radiation detection pixels according to a fifth exemplary embodiment.

FIG. 17 is a plan view illustrating a structure of radiation detection pixels 20B according to the present exemplary embodiment. As illustrated in FIG. 17, in the present exemplary embodiment, a single detection TFT 60 is provided for every two radiation detection pixels 20B, with the detection TFT 60 provided on a scan line 101B running between the two radiation detection pixels 20B. The two radiation detection pixels 20B are configured symmetrically to each other about a line along the axis of the scan line 101B. For ease of explanation the radiation detection pixel 20B illustrated above, the scan line 101B in FIG. 17 will be referred to as radiation detection pixel 20B 1 and the radiation detection pixel 20B illustrated below the scan line 101B will be referred to as radiation detection pixel 20B2.

A semiconductor active layer 61 is formed on the scan line 101B, and the scan line 101B provided between the two radiation detection pixels 20B act as a gate electrode of the detection TFT 60. A source electrode 62 and a drain electrode 64 are formed on the semiconductor active layer 61. The source electrode 62 is connected to the signal line 3 through a connection line 90 provided in the radiation detection pixel 20B 1. The drain electrode 64 is connected to the common electrode line 25 through a connection line 92 provided in the radiation detection pixel 20B2. A bias voltage is accordingly applied from the power source 110 so as to induce a minus clamped state. Note that the layout of the source electrode 62 and the drain electrode 64 is not limited thereto. The drain electrode 64 may be disposed on the radiation detection pixel 20B 1 side and the source electrode 62 may be disposed on the radiation detection pixel 20B2 side.

Note that, even in cases in which the detection TFT 60 is provided on the scan line 101B, it is also preferable for the upper portion of the detection TFT 60 (at least the semiconductor active layer 61) not to be covered by the sensor portion 103 (the semiconductor layers 21). Namely, it is preferable to configure such that light from the scintillator 40 is illuminated directly.

Accordingly, since the detection TFT 60 is provided between the radiation detection pixels 20B, the present exemplary embodiment may enable radiation detection to be performed from the leak current of the detection TFT 60, without reducing the surface area of the region of the sensor portion 103 (the semiconductor layers 21) onto which radiation is irradiated. Accordingly, the present exemplary embodiment may enhance the quality of radiographic images. Further, since the number of scan lines 101 (101B) for applying the detection scan signal to the gate electrodes of the detection TFTs 60 may be reduced, in comparison to cases in which one scan line 101 is provided for each row of the pixels 20, the present the present exemplary embodiment may rise the fabrication yield of the radiation detectors 10. Further, the present the present exemplary embodiment may also reduce the noise by lowering the capacity of the signal lines 3, compared to cases in which one of the detection TFTs 60 is provided for each of the radiation detection pixels 20B.

Note that, configuration may be made such that one of the detection TFTs 60 is always provided for every two of the radiation detection pixels 20B, configuration may be made with all of the pixels 20 of the radiation detector 10 configured as the radiation detection pixels 20B, or configuration may be made such that there are also imaging pixels 20A present.

Further, as in the present exemplary embodiment, when the detection TFTs 60 are provided between the radiation detection pixels 20B, it is preferable for the scan line 101B to be provided as a dedicated scan line for the detection TFTs 60 (equivalent to the detection control line 82 in the fourth exemplary embodiment). This is because the control becomes complicated when, for example, both the imaging pixels 20A and the radiation detection pixels 20B are present in the radiation detector 10 and the scan lines 101A also serve as scan lines 101 of the TFT switches 4, as in some of the above exemplary embodiment.

The radiographic imaging device 100 of the present exemplary embodiment may also be provided with a radiation amount detection circuit 120 and radiation detection signal lines 122 as in the third exemplary embodiment, configured such that the detection TFTs 60 of the radiation detection pixels 20B are connected to the radiation detection signal lines 122 instead of to the radiation detection signal lines 122.

In the above exemplary embodiments, cases in which the radiographic imaging device 100 is employed for detecting the timing the start of irradiation of radiation, based on radiation detected with the radiation detection pixels 20B, have been described. However, the present invention is not limited thereto. The present invention may be applied for detecting the timing of cessation of radiation irradiation from the radiation irradiation device 204, or for detecting the timing of irradiation with a specific amount of radiation from the radiation irradiation device 204.

In each of the above exemplary embodiments, cases in which the radiation is detected by leak current of the detection TFTs 60, have been described. However, there is no limitation to the detection TFTs 60. Another semiconductor elements (for example another photo transistor) in which leak current amount changes according to the light illuminated from the scintillator 40 may be employed for detecting the radiation.

Furthermore, in each of the above exemplary embodiments, cases in which an indirect-conversion-type radiation detector is employed, have been described. However, the present invention is not limited thereto. For example, a direct-conversion-type radiation detector in which radiation is directly converted into charges by a semiconductor layer and the charges accumulated, may be employed. In such cases, the sensor portions generate charges due to irradiation of radiation.

The configurations and operations of the radiation detector 100 and the radiation detector 10 explained in each of the above exemplary embodiments are merely examples. Obviously, various changes are possible according to circumstances within a scope not departing from the spirit of the present invention.

In each of the above exemplary embodiments, there is no particular limitation to the radiation employed, and radiation such as X-rays and gamma rays may be appropriately employed.

What is claimed is:

1. A radiation detector comprising:
    a conversion section that converts radiation into light;
    a plurality of pixels, each of the plurality of pixels including:
        a sensor portion including a photoelectric conversion element that is provided between a substrate and the conversion section and that generates charges due to illumination of light, the sensor portion accumulating charges generated by the photoelectric conversion element; and
        a switching element, provided between the photoelectric conversion element and the substrate, that reads-out the charges generated in the sensor portion; and
    a semiconductor element, provided at a same layer as the switching element, that is between the conversion section and the substrate, the semiconductor element outputting leak current according to the light illuminated from the conversion section without passing through the photoelectric conversion element; wherein
    the switching element is connected to a signal line and outputs the charges that are read out from the sensor portion to the connected signal line;
    the semiconductor element is provided at each of the plurality of pixels;
    the semiconductor element, provided at each of a predetermined plurality of radiation detection pixels that are employed for radiation detection from among the plurality of pixels, is connected to the signal line or a radiation detection signal line and outputs the leak current to the connected signal line or the radiation detection signal line; and
    the semiconductor element, provided at each pixel, other than the radiation detection pixels, is not connected to the signal line or the radiation detection signal line.

2. The radiation detector of claim 1, wherein:
    an insulating layer is formed above the substrate; and
    semiconductor active layers of the switching element and semiconductor active layers of the semiconductor element are formed above the insulating layer.

3. The radiation detector of claim 1, wherein the semiconductor element is provided between the substrate and a region of the conversion section not overlapping with the photoelectric conversion element.

4. The radiation detector of claim 1, wherein the sensor portion comprises a light blocking section that blocks light from being illuminated onto the photoelectric conversion element other than the light illuminated from the conversion section.

5. The radiation detector of claim 1, wherein the semiconductor element is a detection switching element applied with a bias voltage.

6. The radiation detector of claim 1, wherein the semiconductor element is a detection switching element comprising a gate electrode to which a voltage is applied for controlling an amount of current of the leak current output.

7. The radiation detector of claim 1, wherein the semiconductor element is provided between the sensor portions of adjacent pixels.

8. The radiation detector of claim 1, wherein:
    scan signals that control the switching elements ON and OFF are applied to the switching elements via scan lines; and
    the semiconductor element is a detection switching element that is applied with a detection scan signal that controls the detection switching element ON and OFF via a detection control line.

9. The radiation detector of claim 1, wherein a correspondence relationship between an irradiated radiation amount and a charge amount generated by the sensor portion, matches a correspondence relationship between the irradiated radiation amount and an amount of the leak current output from the semiconductor element.

10. A radiographic imaging device comprising:
    the radiation detector of claim 1;
    a detection section that performs detection relating to irradiation of radiation based on charges output from the semiconductor element of the radiation detector; and
    an imaging section that acquires a radiographic image based on a charge amount output from the sensor portions.

11. The radiographic imaging device of claim 10, further comprising:
    a read circuit, provided at each of a plurality of signal lines of the radiation detector, wherein the read circuits read out the charges output to the signal lines,
    wherein the semiconductor elements of the radiation detector output the leak current to the signal lines.

12. A radiographic imaging system comprising:
    a radiation irradiation section; and
    the radiographic imaging device of claim 10, which images a radiographic image of radiation irradiated from the radiation irradiation section.

* * * * *